United States Patent
Zhao et al.

(10) Patent No.: US 10,630,983 B2
(45) Date of Patent: Apr. 21, 2020

(54) TRANSFORM COEFFICIENT DEQUANTIZATION METHOD AND APPARATUS, AND DECODING DEVICE

(71) Applicant: Huawei Technologies Co., Ltd., Shenzhen (CN)

(72) Inventors: Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 15/970,638

(22) Filed: May 3, 2018

(65) Prior Publication Data

US 2018/0255301 A1   Sep. 6, 2018

Related U.S. Application Data

(63) Continuation of application No. PCT/CN2015/094008, filed on Nov. 6, 2015.

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/122* (2014.11); *H04N 19/157* (2014.11);
(Continued)

(58) Field of Classification Search
USPC .................................................. 375/240.03
See application file for complete search history.

(56) References Cited

U.S. PATENT DOCUMENTS 8,279,923 B2   10/2012   Lim et al.
8,451,896 B2   5/2013   Fong et al.
(Continued)

FOREIGN PATENT DOCUMENTS

CN   103517069 A   1/2014
CN   103975592 A   8/2014
(Continued)

OTHER PUBLICATIONS

Machine Translation and Abstract of Chinese Publication No. CN104270641, Jan. 7, 2015, 34 pages.
Richardson, I., "H.264 and MPEG-4 Video Compression, Video Coding for Next-generation Multimedia," John Wiley and Sons Ltd, 2003, 307 pages.
(Continued)

*Primary Examiner* — Jeremiah C Hallenbeck-Huber
(74) *Attorney, Agent, or Firm* — Conley Rose, P.C.

(57) ABSTRACT

A unit size of a to-be-processed unit corresponding to a first transform coefficient set is determined using division information. Then, a quantization regulation factor for the first transform coefficient set is determined according to a first preset algorithm and the unit size of the to-be-processed unit, and with the first preset algorithm, the quantization regulation factor decreases progressively with the size of the to-be-processed unit. Dequantization processing is performed on a transform coefficient in the first transform coefficient set according to a second preset algorithm using the quantization regulation factor. Therefore, a decoding device adaptively determines the quantization regulation factor for the first transform coefficient set according to the unit size of the to-be-processed unit, and then performs dequantization processing on the transform coefficient in the first transform coefficient set using the determined quantization regulation factor.

19 Claims, 4 Drawing Sheets

(51) Int. Cl.
*H04N 9/18* (2006.01)
*H04N 19/157* (2014.01)
*H04N 19/122* (2014.01)
*H04N 19/18* (2014.01)
*H04N 19/44* (2014.01)
*H04N 19/91* (2014.01)

(52) U.S. Cl.
CPC ........... *H04N 19/176* (2014.11); *H04N 19/18* (2014.11); *H04N 19/44* (2014.11); *H04N 19/91* (2014.11)

(56) References Cited

U.S. PATENT DOCUMENTS

| | | | | |
|---|---|---|---|---|
| 2012/0189052 | A1* | 7/2012 | Karczewicz | H04N 19/176 375/240.12 |
| 2013/0287099 | A1* | 10/2013 | Kwon | H04N 19/176 375/240.03 |
| 2013/0315301 | A1* | 11/2013 | Shiozawa | H04N 19/176 375/240.03 |
| 2013/0322527 | A1 | 12/2013 | Guo et al. | |
| 2014/0056361 | A1* | 2/2014 | Karczewicz | H04N 19/60 375/240.18 |
| 2014/0219339 | A1* | 8/2014 | Park | H04N 19/176 375/240.03 |
| 2014/0219343 | A1* | 8/2014 | Park | H04N 19/11 375/240.12 |
| 2014/0254670 | A1* | 9/2014 | Kwon | H04N 19/176 375/240.12 |
| 2017/0223381 | A1 | 8/2017 | Yang et al. | |
| 2018/0007367 | A1 | 1/2018 | Zeng et al. | |

FOREIGN PATENT DOCUMENTS

| | | | |
|---|---|---|---|
| CN | 104270641 | A | 1/2015 |
| CN | 104702962 | A | 6/2015 |
| EP | 2773117 | A1 | 9/2014 |
| KR | 20140111139 | A | 9/2014 |
| WO | 2004036501 | A2 | 4/2004 |
| WO | 2013064109 | A1 | 5/2013 |

OTHER PUBLICATIONS

Foreign Communication From a Counterpart Application, Chinese Application No. 201580073663.9, Chinese Office Action dated Apr. 4, 2019, 9 pages.
Foreign Communication From a Counterpart Application, Chinese Application No. 201580073663.9, Chinese Search Report dated Apr. 4, 2019, 2 pages.
Foreign Communication From a Counterpart Application, European Application No. 15907652.0, Extended European Search Report dated May 4, 2018, 9 pages.
Machine Translation and Abstract of Chinese Publication No. CN103517069, Jan. 15, 2014, 15 pages.
Richardson, I., "H.264 and MPEG-4 Video Compression Video Coding for Next-generation Multimedia," 2003, 307 pages.
"Advanced audio and video coding of information technology Part two: Video, Information technology—Advanced coding of audio and video—Part 2: Video", (Submitted for approval), National Standards of the People''s Republic of China, GB/T 20090.2-2006, 93 pages.
English Translation of "Advanced audio and video coding of information technology Part two: Video, Information technology—Advanced coding of audio and video—Part 2: Video", (Submitted for approval), National Standards of the People''s Republic of China, GB/T 20090.2-2006, 107 pages.
"Series H: Audiovisual and Multimedia Systems, Infrastructure of audiovisual services—Coding of moving video, Advanced video coding for generic audiovisual services," ITU-T H.264, Feb. 2014, 790 pages.
"Series H: Audiovisual and Multimedia Systems Infrastructure of audiovisual services—Coding of moving video, High efficiency video coding," ITU-T H.265, ITU-T, Apr. 2015, 634 pages.
Foreign Communication From a Counterpart Application, PCT Application No. PCT/CN2015/094008, English Translation of International Search Report dated Jul. 26, 2016, 2 pages.
Foreign Communication From a Counterpart Application, Korean Application No. 10-2018-7008492, Korean Office Action dated Nov. 6, 2019, 5 pages.
Foreign Communication From a Counterpart Application, Korean Application No. 10-2018-7008492, English Translation of Korean Office Action dated Nov. 6, 2019, 3 pages.

\* cited by examiner

TRANSFORM COEFFICIENT DEQUANTIZATION METHOD AND APPARATUS, AND DECODING DEVICE

CROSS-REFERENCE TO RELATED APPLICATION

This application is a continuation of International Application No. PCT/CN2015/094008 filed on Nov. 6, 2015, which is hereby incorporated by reference in its entirety.

TECHNICAL FIELD

The present disclosure belongs to the field of video coding and decoding technologies, and in particular, to a transform coefficient dequantization method and apparatus, and a decoding device.

BACKGROUND

A video compression technology is widely applied to the Internet, television broadcasting, and communications fields. H.265/High Efficiency Video Coding (HEVC) is a new international video coding standard. HEVC uses a hybrid coding framework with block-based motion compensation and discrete cosine transform (DCT).

For HEVC, a coding process mainly includes prediction, transformation, quantization, and entropy coding, and a decoding process mainly includes entropy decoding, prediction, dequantization, and inverse transformation.

In the coding process, a predicted pixel for an original pixel corresponding to a current code block is generated during prediction using a reconstructed pixel of a coded region, and a prediction manner mainly includes intra-frame prediction and inter-frame prediction, during transformation, a residual, which is a pixel value difference between the original pixel and the predicted pixel, is transformed to a transform coefficient, during quantization, quantization processing is performed on the transform coefficient, during entropy coding, a quantized transform coefficient and coding scheme information are transformed into a code stream by means of entropy coding processing.

In the decoding process entropy decoding processing is performed on a code stream to parse out coding scheme information and the quantized transform coefficient during entropy decoding, during prediction, the coding scheme information and the decoded reconstructed pixel are used to obtain the predicted pixel, during dequantization, the quantized transform coefficient is dequantized to obtain a reconstructed transform coefficient, during inverse transformation, inverse transformation is performed on the reconstructed transform coefficient to obtain reconstructed residual information, and then the reconstructed residual information and the predicted pixel are added to obtain a reconstructed pixel in order to recover a video image.

For lossy encoding, a reconstructed pixel and an original pixel may be different, and a value difference between the reconstructed pixel and the original pixel is referred to as distortion. Visual entropy masking effect indicates that human eyes are less sensitive to a complex region than to a simple region, and compared with that in a relative flat region, signal distortion that happens in a complex region is more difficult to observe or has weaker visual intensity.

Based on the foregoing theory, to improve overall efficiency of coding a video image, relatively fine quantization is performed in the complex region, and relatively coarse quantization is performed in the simple region. In the coding process, the complex region is usually divided into blocks of relatively small sizes for performing coding, and the flat region is usually divided into blocks of relatively large sizes for performing coding. For a block of a relatively small size, a quantization step size is properly increased in the quantization process. For a block of a relatively large size, a quantization step size is properly decreased in the quantization process. That is, in the quantization process, different quantization step sizes are used in all regions of an image. Compared with a uniform quantization step size, different quantization step sizes help improve overall visual quality of a coded image.

Currently, in a disclosed video coding/decoding scheme, a coding device analyzes a video sequence, determines a quantization parameter of each code block (including quantization step size regulation information of each code block), and writes the quantization parameter into a code stream. A decoding device determines a quantization step size of each code block according to the quantization parameter obtained by parsing the code stream, and completes transform coefficient dequantization processing. However, this solution has a disadvantage. The decoding device can determine, based on the quantization step size regulation information in the code stream, a quantization step size of each code block only when the code stream sent by the coding device carries the quantization step size regulation information of each coding block in order to perform dequantization on a transform coefficient. Coding efficiency is reduced because the code stream carries the quantization step size regulation information of each code block.

SUMMARY

In view of this, an objective of the present disclosure is to provide a transform coefficient dequantization method and apparatus, and a decoding device. The decoding device can adaptively determine a quantization regulation factor to complete a transform coefficient dequantization process. The coding device does not need to add quantization step size regulation information to a code stream, thereby improving coding efficiency.

To achieve the foregoing objective, technical solutions provided in embodiments of this application are as follows.

According to a first aspect of the embodiments of this application, a transform coefficient dequantization method is provided, including determining, using division information, a unit size of a to-be-processed unit corresponding to a first transform coefficient set, where the first transform coefficient set and the division information are generated by performing entropy decoding on a code stream, determining a quantization regulation factor for the first transform coefficient set according to a first preset algorithm and the unit size of the to-be-processed unit, where with the first preset algorithm, the quantization regulation factor decreases progressively with a value of the unit size of the to-be-processed unit, and performing dequantization processing on a transform coefficient in the first transform coefficient set according to a second preset algorithm using the quantization regulation factor to obtain a second transform coefficient set.

With reference to the first aspect, in a first possible implementation, the to-be-processed unit includes a first transform unit, and determining, using division information, a unit size of a to-be-processed unit corresponding to a first transform coefficient set includes determining a size of the first transform unit using the division information, and determining the size of the first transform unit as the unit size of the to-be-processed unit.

With reference to the first aspect, in a second possible implementation, the to-be-processed unit includes a first transform unit and a first coding unit, and the first coding unit is a smallest coding unit including the first transform unit, and determining, using division information, a unit size of a to-be-processed unit corresponding to a first transform coefficient set includes determining a size of the first transform unit using the division information, determining a size of the first coding unit using the division information, and determining the size of the first coding unit as the unit size of the to-be-processed unit when the size of the first coding unit is greater than a first threshold, or determining the size of the first transform unit as the unit size of the to-be-processed unit when the size of the first coding unit is less than or equal to the first threshold.

With reference to the first aspect, in a third possible implementation, the to-be-processed unit includes a first transform unit and a first predicting unit, and the first predicting unit is a predicting unit whose overlapping region is largest in predicting units that overlap with the first transform unit, and determining, using division information, a unit size of a to-be-processed unit corresponding to a first transform coefficient set includes determining a size of the first transform unit using the division information, determining a size of the first predicting unit using the division information, and determining the size of the first predicting unit as the unit size of the to-be-processed unit when the size of the first predicting unit is greater than a second threshold, or determining the size of the first transform unit as the unit size of the to-be-processed unit when the size of the first predicting unit is less than or equal to the second threshold.

With reference to the first aspect, in a fourth possible implementation, the to-be-processed unit includes a first transform unit, a first coding unit, and a first predicting unit, the first coding unit is a smallest coding unit including the first transform unit, and the first predicting unit is a largest predicting unit that overlaps with the first transform unit, and determining, using division information, a unit size of a to-be-processed unit corresponding to a first transform coefficient set includes determining a size of the first predicting unit using the division information, determining a size of the first coding unit using the division information, calculating an average of the size of the first predicting unit and the size of the first coding unit, and determining the average as the unit size of the to-be-processed unit when the average is greater than a third threshold, or determining a size of the first transform unit using the division information when the average is less than or equal to the third threshold, and determining the size of the first transform unit as the unit size of the to-be-processed unit.

With reference to the first aspect, in a fifth possible implementation, the to-be-processed unit includes a first transform unit, a first coding unit, and a first predicting unit, the first coding unit is a smallest coding unit including the first transform unit, and the first predicting unit is a largest predicting unit that overlaps with the first transform unit, and determining, using division information, a unit size of a to-be-processed unit corresponding to a first transform coefficient set includes determining a size of the first transform unit using the division information, determining a size of the first coding unit using the division information, determining a size of the first predicting unit using the division information, and calculating a weighted average of the size of the first transform unit, the size of the first coding unit, and the size of the first predicting unit, and determining the weighted average as the unit size of the to-be-processed unit.

With reference to the first aspect, in a sixth possible implementation, the to-be-processed unit corresponding to the first transform coefficient set is a first coding unit, and determining, using division information, a unit size of a to-be-processed unit corresponding to a first transform coefficient set includes determining a size of the first coding unit using the division information, and determining the size of the first coding unit as the unit size of the to-be-processed unit.

With reference to the first aspect, in a seventh possible implementation, the to-be-processed unit corresponding to the first transform coefficient set is a first predicting unit, and determining, using division information, a unit size of a to-be-processed unit corresponding to a first transform coefficient set includes determining a size of the first predicting unit using the division information, and determining the size of the first predicting unit as the unit size of the to-be-processed unit.

With reference to the first aspect, in an eighth possible implementation, the to-be-processed unit corresponding to the first transform coefficient set is a first coding unit and a first predicting unit, and determining, using division information, a unit size of a to-be-processed unit corresponding to a first transform coefficient set includes determining a size of the first coding unit using the division information, determining a size of the first predicting unit using the division information, determining the size of the first coding unit as the size of the to-be-processed unit when the size of the first coding unit is greater than a fourth threshold, or determining the size of the first predicting unit as the size of the to-be-processed unit when the size of the first coding unit is less than or equal to a fourth threshold.

With reference to any one of the first aspect or the first to the eighth possible implementations of the first aspect, in a ninth possible implementation, determining a quantization regulation factor for the first transform coefficient set according to a first preset algorithm and the unit size of the to-be-processed unit includes calculating the quantization regulation factor for the first transform coefficient set using a formula $$QC = M_1^{(A_1 - \log_{N_1} Size)/K_1},$$

where QC is the quantization regulation factor for the first transform coefficient set, Size is the unit size of the to-be-processed unit, $N_1$ and $M_1$ are positive numbers that are not less than 1, and $K_1$ and $A_1$ are positive numbers.

With reference to any one of the first aspect or the first to the eighth possible implementations of the first aspect, in a tenth possible implementation, determining a quantization regulation factor for the first transform coefficient set according to a first preset algorithm and the unit size of the to-be-processed unit includes calculating the quantization regulation factor for the first transform coefficient set using a formula $$QC = \frac{a_1}{\log_{N_1} Size} + b_1,$$

where QC is the quantization regulation factor for the first transform coefficient set, Size is the unit size of the to-be-processed unit, $N_1$ is a positive number that is not less than 1, and $a_1$ and $b_1$ are positive numbers.

With reference to the first possible implementation of the first aspect, in an eleventh possible implementation, determining a quantization regulation factor for the first transform coefficient set according to a first preset algorithm and the unit size of the to-be-processed unit includes parsing the code stream to obtain sizes of T transform units allowed for use, a quantization regulation factor ($QC_1$) corresponding to a largest transform unit, and quantization regulation factor difference information between a $t^{th}$-level transform unit and a $(t-1)^t$-level transform unit that are carried in the code stream ($dQC_t$), where $t=2, 3, \ldots$, or T, T is an integer greater than 3, for any two transform units at adjacent levels, a size of a transform unit at a lower level is greater than a size of another transform unit, and the $dQC_t$ is all or partially greater than 0, determining, using the $QC_1$ corresponding to the largest transform unit and the $dQC_t$, quantization regulation factors corresponding to the T transform units, and determining a transform unit whose size is the same as that of the first transform unit and that is of the T transform units, as a target transform unit, and determining a quantization regulation factor corresponding to the target transform unit, as a quantization regulation factor for the to-be-processed unit.

With reference to the sixth possible implementation of the first aspect, in a twelfth possible implementation, the determining a quantization regulation factor for the first transform coefficient set according to a first preset algorithm and the unit size of the to-be-processed unit is further parsing the code stream to obtain sizes of P coding units allowed for use, a $QC_1$ corresponding to a largest coding unit, and quantization regulation factor difference information between a $p^{th}$-level coding unit and a $(p-1)^t$-level coding unit that are carried in the code stream ($dQC_p$), where $p=2, 3, \ldots$, or P, P is an integer greater than 3, and for any two coding units at adjacent levels, a size of a coding unit at a smaller level is greater than a size of another coding unit, and the $dQC_p$ is all or partially greater than 0, determining, using the $QC_1$ corresponding to the largest coding unit and the $dQC_p$, quantization regulation factors corresponding to the P coding units, and determining a coding unit whose size is the same as that of the first coding unit and that is of the P coding units, as a target coding unit, and determining a quantization regulation factor corresponding to the target coding unit, as a quantization regulation factor for the to-be-processed unit.

With reference to the seventh possible implementation of the first aspect, in a thirteenth possible implementation, the determining a quantization regulation factor for the first transform coefficient set according to a first preset algorithm and the unit size of the to-be-processed unit includes parsing the code stream to obtain sizes of Z predicting units allowed for use, a $QC_1$ corresponding to a largest predicting unit, and quantization regulation factor difference information between a $z^{th}$-level predicting unit and a $(z-1)^{th}$-level predicting unit that are carried in the code stream ($dQC_z$), where $z=2, 3, \ldots$, or Z, Z is an integer greater than 3, for any two predicting units at adjacent levels, a size of a predicting unit at a smaller level is greater than a size of another predicting unit, and the $dQC_z$ is all or partially greater than 0, determining quantization regulation factors corresponding to the Z predicting units using the $QC_1$ corresponding to the largest predicting unit and the $dQC_z$, and determining a predicting unit whose size is the same as that of the first predicting unit and that is of the Z predicting units, as a target predicting unit, and determining a quantization regulation factor corresponding to the target predicting unit, as a quantization regulation factor for the to-be-processed unit.

With reference to any one of the ninth to the thirteenth possible implementations of the first aspect, in a fourteenth possible implementation, the performing dequantization processing on a transform coefficient in the first transform coefficient set according to a second preset algorithm using the quantization regulation factor includes performing dequantization processing on each transform coefficient in the first transform coefficient set using a formula $R(i)=\text{sign}\{A(i)\}\cdot\text{round}\{A(i)\cdot Qs(i)\cdot QC+o2(i)\}$, where $i=1, 2, \ldots$, or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, $o2(i)$ is a roundoff bias corresponding to the $i^{th}$ transform coefficient in the first transform coefficient set, and $R(i)$ is an $i^{th}$ transform coefficient in the second transform coefficient set.

With reference to any one of the ninth to the thirteenth possible implementations of the first aspect, in a fifteenth possible implementation, performing dequantization processing on a transform coefficient in the first transform coefficient set according to a second preset algorithm using the quantization regulation factor includes performing rounding processing on the quantization regulation factor, performing rounding processing on an original quantization step size corresponding to each transform coefficient in the first transform coefficient set, and performing dequantization processing on each transform coefficient in the first transform coefficient set using a formula $R(i)=\text{sign}\{A(i)\}\cdot(A(i)\cdot Qs'(i)\cdot QC'+(1<<(bdshift-1+delta)))>>(bdshift+delta)$, where $i=1, 2, \ldots$, or N, N is a quantity of transform coefficients included in the first transform coefficient set, $A(i)$ is an $i^{th}$ transform coefficient in the first transform coefficient set, $Qs'(i)$ is a result generated after rounding processing is performed on the original quantization step size corresponding to the $i^{th}$ transform coefficient in the first transform coefficient set, $QC'$ is the quantization regulation factor that is after the rounding processing, bdshift is a bit shift amount, delta is an additional bit shift amount, $<<$ is a left shift operator, $>>$ is a right shift operator, and $R(i)$ is an $i^{th}$ transform coefficient in the second transform coefficient set.

With reference to any one of the ninth to the thirteenth possible implementations of the first aspect, in a sixteenth possible implementation, performing dequantization processing on a transform coefficient in the first transform coefficient set according to a second preset algorithm using the quantization regulation factor includes performing dequantization processing on each transform coefficient in the first transform coefficient set using a formula $B(i)=\text{sign}\{A(i)\}\cdot\text{round}\{A(i)\cdot Qs(i)+o4(i)\}$ to obtain a third transform coefficient set, and performing scaling processing and rounding processing on each transform coefficient in the third transform coefficient set using a formula $R(i)=\text{sign}\{B(i)\}\cdot\text{round}\{B(i)\cdot QC+o5(i)\}$ to obtain the second transform coefficient set, where $i=1, 2, \ldots$, or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, $o4(i)$ is a roundoff bias corresponding to the $i^{th}$ transform coefficient in the first transform coefficient set, $B(i)$ is an $i^{th}$ transform coefficient in the third transform coefficient set, $o5(i)$ is a roundoff bias corresponding to the $i^{th}$ transform coefficient in the third transform coefficient set, and R(i) is an $i^{th}$ transform coefficient in the second transform coefficient set.

With reference to any one of the ninth to the thirteenth possible implementations of the first aspect, in a seventeenth possible implementation, performing dequantization processing on a transform coefficient in the first transform coefficient set according to a second preset algorithm using the quantization regulation factor includes obtaining a level scale table corresponding to the quantization regulation factor, determining, according to a third preset algorithm using the level scale table, a quantization step size for performing dequantization processing on the first transform coefficient set, and performing, according to a fourth preset algorithm using the quantization step size, dequantization processing on the first transform coefficient set.

With reference to the seventeenth possible implementation of the first aspect, in an eighteenth possible implementation, obtaining a level scale table corresponding to the quantization regulation factor includes separately multiplying M level scale values in a preset level scale table by the quantization regulation factor, and separately performing rounding processing on M products to obtain the level scale table for performing dequantization processing on the first transform coefficient set.

With reference to the seventeenth possible implementation of the first aspect, in a nineteenth possible implementation, obtaining a level scale table corresponding to the quantization regulation factor includes separately multiplying M level scale values in a preset level scale table by the quantization regulation factor, separately performing rounding processing on M products to obtain M intermediate values, determining M integer sets, where an $m^{th}$ integer set uses an $m^{th}$ intermediate value as a center, and m=1, 2, . . . , or M, and selecting an integer from each of the M integer sets according to a preset rule to form the level scale table for performing dequantization processing on the first transform coefficient set.

With reference to the nineteenth possible implementation of the first aspect, in a twentieth possible implementation, selecting an integer from an integer set according to a preset rule includes calculating, using formulas $B_{j,1}=\lfloor 2^P/D_j \rfloor$ and $B_{j,2}=\lceil 2^P/D_j \rceil$ intermediate value $B_{j,1}$ and a second intermediate value $B_{j,2}$ corresponding to each integer in the integer set, where P is an integer greater than 1, Dj is a $j^{th}$ integer in the integer set, j=1, 2, . . . , or J, and J is a quantity of integers included in the integer set, calculating, using a formula $C_j=\min(|D_j \cdot B_{j,1}-2^P|,|D_j \cdot B_{j,2}-2^P|)$, a third intermediate value $C_j$ corresponding to each integer in the integer set, and determining a minimum value $C_k$ in the third intermediate values $C_j$, and selecting, from the integer set, an integer corresponding to the minimum value $C_k$.

With reference to the seventeenth possible implementation of the first aspect, in a twenty-first possible implementation, obtaining a level scale table corresponding to the quantization regulation factor includes determining a value range of the quantization regulation factor from multiple preset value ranges, where each value range corresponds to a level scale table, and obtaining a level scale table corresponding to the value range of the quantization regulation factor.

According to a second aspect of the embodiments of the present disclosure, a transform coefficient dequantization apparatus is provided, including a unit size determining unit configured to determine, using division information, a unit size of a to-be-processed unit corresponding to a first transform coefficient set, where the first transform coefficient set and the division information are generated by performing entropy decoding on a code stream, a quantization regulation factor determining unit configured to determine a quantization regulation factor for the first transform coefficient set according to a first preset algorithm and the unit size of the to-be-processed unit that is determined by the unit size determining unit, where with the first preset algorithm, the quantization regulation factor decreases progressively with a value of the unit size of the to-be-processed unit, and a dequantization unit configured to perform dequantization processing on a transform coefficient in the first transform coefficient set according to a second preset algorithm using the quantization regulation factor determined by the quantization regulation factor determining unit to obtain a second transform coefficient set.

With reference to the second aspect, in a first possible implementation, the to-be-processed unit includes a first transform unit, and the unit size determining unit includes a first size determining module configured to determine a size of the first transform unit using the division information, and a first processing module configured to determine the size of the first transform unit that is determined by the first size determining module, as the unit size of the to-be-processed unit.

With reference to the second aspect, in a second possible implementation, the to-be-processed unit includes a first transform unit and a first coding unit, and the first coding unit is a smallest coding unit including the first transform unit, and the unit size determining unit includes a first size determining module configured to determine a size of the first transform unit using the division information, a second size determining module configured to determine a size of the first coding unit using the division information, and a second processing module configured to determine the size of the first coding unit that is determined by the second size determining module, as the unit size of the to-be-processed unit when the size of the first coding unit is greater than a first threshold or determine the size of the first transform unit that is determined by the first size determining module, as the unit size of the to-be-processed unit when the size of the first coding unit is less than or equal to the first threshold.

With reference to the second aspect, in a third possible implementation, the to-be-processed unit includes a first transform unit and a first predicting unit, and the first predicting unit is a predicting unit whose overlapping region is largest in predicting units that overlap with the first transform unit, and the unit size determining unit includes a first size determining module configured to determine a size of the first transform unit using the division information, a third size determining module configured to determine a size of the first predicting unit using the division information, and a third processing module configured to determine the size of the first predicting unit as the unit size of the to-be-processed unit when the size of the first predicting unit that is determined by the third size determining module is greater than a second threshold or determine the size of the first transform unit as the unit size of the to-be-processed unit when the size of the first predicting unit that is determined by the third size determining module is less than or equal to the second threshold.

With reference to the second aspect, in a fourth possible implementation, the to-be-processed unit includes a first transform unit, a first coding unit, and a first predicting unit, the first coding unit is a smallest coding unit including the first transform unit, and the first predicting unit is a largest predicting unit that overlaps with the first transform unit, and the unit size determining unit includes a first size determining module configured to determine a size of the first transform unit using the division information, a second size determining module configured to determine a size of the first coding unit using the division information, a third size determining module configured to determine a size of the first predicting unit using the division information, an average calculation module configured to calculate an average of the size of the first predicting unit and the size of the first coding unit, and a fourth processing module configured to determine the average as the unit size of the to-be-processed unit when the average is greater than a third threshold or determine the size of the first transform unit that is determined by the first size determining module, as the unit size of the to-be-processed unit when the average calculated by the average calculation module is less than or equal to the third threshold.

With reference to the second aspect, in a fifth possible implementation, the to-be-processed unit includes a first transform unit, a first coding unit, and a first predicting unit, the first coding unit is a smallest coding unit including the first transform unit, and the first predicting unit is a largest predicting unit that overlaps with the first transform unit, and the unit size determining unit includes a first size determining module configured to determine a size of the first transform unit using the division information, a second size determining module configured to determine a size of the first coding unit using the division information, a third size determining module configured to determine a size of the first predicting unit using the division information, and a fifth processing module configured to calculate a weighted average of the size of the first transform unit, the size of the first coding unit, and the size of the first predicting unit, and determine the weighted average as the unit size of the to-be-processed unit.

With reference to the second aspect, in a sixth possible implementation, the to-be-processed unit is a first coding unit, and the unit size determining unit includes a second size determining module configured to determine a size of the first coding unit using the division information, and a sixth processing module configured to determine the size of the first coding unit that is determined by the second size determining module, as the size of the to-be-processed unit.

With reference to the second aspect, in a seventh possible implementation, the to-be-processed unit corresponding to the first transform coefficient set is a first predicting unit, and the unit size determining unit includes a third size determining module configured to determine a size of the first predicting unit using the division information, and a seventh processing module configured to determine the size of the first predicting unit that is determined by the third size determining module, as the size of the to-be-processed unit.

With reference to the second aspect, in an eighth possible implementation, the to-be-processed unit corresponding to the first transform coefficient set is a first coding unit and a first predicting unit, and the unit size determining unit includes a second size determining module configured to determine a size of the first coding unit using the division information, a third size determining module configured to determine a size of the first predicting unit using the division information, and an eighth processing unit configured to determine the size of the first coding unit as the size of the to-be-processed unit when the size of the first coding unit that is determined by the second size determining module is greater than a fourth threshold or determine the size of the first predicting unit as the size of the to-be-processed unit when the size of the first coding unit that is determined by the second size determining module is less than or equal to a fourth threshold.

With reference to any one of the second aspect or the first to the eighth possible implementations of the second aspect, in a ninth possible implementation, the quantization regulation factor determining unit includes a first quantization regulation factor determining module, and the first quantization regulation factor determining module calculates the quantization regulation factor for the first transform coefficient set using a formula $$QC = M_1^{(A_1 - \log_{N_1} Size)/K_1},$$

where QC is the quantization regulation factor for the first transform coefficient set, Size is the unit size of the to-be-processed unit, $N_1$ and $M_1$ are positive numbers that are not less than 1, and $K_1$ and $A_1$ are positive numbers.

With reference to any one of the second aspect or the first to the eighth possible implementations of the second aspect, in a tenth possible implementation, the quantization regulation factor determining unit includes a second quantization regulation factor determining module, and the second quantization regulation factor determining module calculates the quantization regulation factor for the first transform coefficient set using a formula $$QC = \frac{a_1}{\log_{N_1} Size} + b_1,$$

where QC is the quantization regulation factor for the first transform coefficient set, Size is the unit size of the to-be-processed unit, $N_1$ is a positive number that is not less than 1, and $a_1$ and $b_1$ are positive numbers.

With reference to the first possible implementation of the second aspect, in an eleventh possible implementation, the quantization regulation factor determining unit includes a first parsing module configured to parse the code stream to obtain sizes of T transform units allowed for use, a $QC_1$ corresponding to a largest transform unit, and $dQC_t$, where $t=2, 3, \ldots,$ or T, T is an integer greater than 3, for any two transform units at adjacent levels, a size of a transform unit at a lower level is greater than a size of another transform unit, and the $dQC_t$ is all or partially greater than 0, a first calculation module configured to determine, using the $QC_1$ corresponding to the largest transform unit and the $dQC_t$, quantization regulation factors corresponding to the T transform units, and a third quantization regulation factor determining module configured to determine a transform unit whose size is the same as that of the first transform unit and that is of the T transform units, as a target transform unit, and determine a quantization regulation factor corresponding to the target transform unit, as a quantization regulation factor for the to-be-processed unit.

With reference to the sixth possible implementation of the second aspect, in a twelfth possible implementation, the quantization regulation factor determining unit includes a second parsing module configured to parse the code stream to obtain sizes of P coding units allowed for use, a $QC_1$ corresponding to a largest coding unit, and $dQC_p$, where $p=2, 3, \ldots,$ or P, P is an integer greater than 3, for any two coding units at adjacent levels, a size of a coding unit at a smaller level is greater than a size of another coding unit, and the $dQC_p$ is all or partially greater than 0, a second calculation module configured to determine, using the $QC_1$ corresponding to the largest coding unit and the $dQC_p$, quantization regulation factors corresponding to the P coding units, and a fourth quantization regulation factor determining module configured to determine a coding unit whose size is the same as that of the first coding unit and that is of the P coding units, as a target coding unit, and determine a quantization regulation factor corresponding to the target coding unit, as a quantization regulation factor for the to-be-processed unit.

With reference to the seventh possible implementation of the second aspect, in a thirteenth possible implementation, the quantization regulation factor determining unit includes a third parsing module configured to parse the code stream to obtain sizes of Z predicting units allowed for use, a $QC_1$ corresponding to a largest predicting unit, and $dQC_z$, where $z=2, 3, \ldots$, or Z, Z is an integer greater than 3, for any two predicting units at adjacent levels, a size of a predicting unit at a smaller level is greater than a size of another predicting unit, and the $dQC_z$ is all or partially greater than 0, a third calculation module configured to determine quantization regulation factors corresponding to the Z predicting units using the $QC_1$ corresponding to the largest predicting unit and the $dQC_z$, and a fifth quantization regulation factor determining module configured to determine a predicting unit whose size is the same as that of the first predicting unit and that is of the Z predicting units, as a target predicting unit, and determine a quantization regulation factor corresponding to the target predicting unit as the quantization regulation factor for the to-be-processed unit.

With reference to any one of the ninth to the thirteenth possible implementations of the second aspect, in a fourteenth possible implementation, the dequantization unit includes a first dequantization module, and the first dequantization module performs dequantization processing on each transform coefficient in the first transform coefficient set using a formula $R(i)=\text{sign}\{A(i)\}\cdot\text{round}\{A(i)\cdot Qs(i)\cdot QC+o2(i)\}$, where $i=1, 2, \ldots$, or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, QC is the quantization regulation factor, $o2(i)$ is a roundoff bias corresponding to the $i^{th}$ transform coefficient in the first transform coefficient set, and $R(i)$ is an $i^{th}$ transform coefficient in the second transform coefficient set.

With reference to any one of the ninth to the thirteenth possible implementations of the second aspect, in a fifteenth possible implementation, the dequantization unit includes a first rounding processing module configured to perform rounding process on the quantization regulation factor, a second rounding processing module configured to perform rounding process on an original quantization step size corresponding to each transform coefficient in the first transform coefficient set, and a second dequantization module configured to perform dequantization processing on each transform coefficient in the first transform coefficient set using a formula $R(i)=\text{sign}\{A(i)\}\cdot(A(i)\cdot Qs'(i)\cdot QC'+(1<<(bdshift-1+delta)))>>(bdshift+delta)$, where $i=1, 2, \ldots$, or N, N is a quantity of transform coefficients included in the first transform coefficient set, $A(i)$ is an $i^{th}$ transform coefficient in the first transform coefficient set, $Qs'(i)$ is a result generated after rounding processing is performed on the original quantization step size corresponding to the $i^{th}$ transform coefficient in the first transform coefficient set, QC' is the quantization regulation factor that is after the rounding processing, bdshift is a bit shift amount, delta is an additional bit shift amount, $<<$ is a left shift operator, $>>$ is a right shift operator, and $R(i)$ is an $i^{th}$ transform coefficient in the second transform coefficient set.

With reference to any one of the ninth to the thirteenth possible implementations of the second aspect, in a sixteenth possible implementation, the dequantization unit includes a third dequantization module configured to perform dequantization processing on each transform coefficient in the first transform coefficient set using a formula $B(i)=\text{sign}\{A(i)\}\cdot\text{round}\{A(i)\cdot Qs(i)+o4(i)\}$ to obtain a third transform coefficient set, and a transform coefficient processing module configured to perform scaling processing and rounding processing on each transform coefficient in the third transform coefficient set using a formula $R(i)=\text{sign}\{B(i)\}\cdot\text{round}\{B(i)\cdot QC+o5(i)\}$ to obtain the second transform coefficient set, where $i=1, 2, \ldots$, or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, $o4(i)$ is a roundoff bias corresponding to the $i^{th}$ transform coefficient in the first transform coefficient set, $B(i)$ is an $i^{th}$ transform coefficient in the third transform coefficient set, QC is the quantization regulation factor, $o5(i)$ is a roundoff bias corresponding to the $i^{th}$ transform coefficient in the third transform coefficient set, and $R(i)$ is an $i^{th}$ transform coefficient in the second transform coefficient set.

With reference to any one of the ninth to the thirteenth possible implementations of the second aspect, in a seventeenth possible implementation, the dequantization unit includes a level scale table obtaining module configured to obtain a level scale table corresponding to the quantization regulation factor, a quantization step size determining module configured to determine, according to a third preset algorithm using the level scale table obtained by the level scale table obtaining module, a quantization step size for performing dequantization processing on the first transform coefficient set, and a fourth dequantization module configured to perform, according to a fourth preset algorithm using the quantization step size determined by the quantization step size determining module, dequantization processing on the first transform coefficient set.

With reference to the seventeenth possible implementation of the second aspect, in an eighteenth possible implementation, the level scale table obtaining module includes a calculation submodule configured to separately multiply M level scale values in a preset level scale table by the quantization regulation factor, and a first rounding processing submodule configured to separately perform rounding processing on M products obtained by the calculation submodule to obtain the level scale table for performing dequantization processing on the first transform coefficient set.

With reference to the seventeenth possible implementation of the second aspect, in a nineteenth possible implementation, the level scale table obtaining module includes a calculation submodule configured to separately multiply M level scale values in a preset level scale table by the quantization regulation factor, a second rounding processing submodule configured to separately perform rounding processing on M products obtained by the calculation submodule, to obtain M intermediate values, an integer set determining submodule configured to determine M integer sets using the M intermediate values obtained by the second rounding processing submodule, where an $m^{th}$ integer set uses an $m^{th}$ intermediate value as a center, and $m=1, 2, \ldots$, or M, and a processing submodule configured to select an integer from each of the M integer sets according to a preset rule to form the level scale table for performing dequantization processing on the first transform coefficient set.

With reference to the nineteenth possible implementation of the second aspect, in a twentieth possible implementation, the processing submodule is further configured to calculate, using formulas $B_{j,1}=\lfloor 2^P/D_j \rfloor$ and $B_{j,2}=\lceil 2^P/D_j \rceil$, a first intermediate value $B_{j,1}$ and a second intermediate value $B_{j,2}$ corresponding to each integer in the integer set, where P is an integer greater than 1, Dj is a $j^{th}$ integer in the integer set, j=1, 2, ..., or J, and J is a quantity of integers included in the integer set, calculate, using a formula $C_j=\min(|D_j \cdot B_{j,1}-2^P|,|D_j \cdot B_{j,2}-2^P|)$, a third intermediate value $C_j$ corresponding to each integer in the integer set, and determine a minimum value $C_k$ in the third intermediate values $C_j$, and select, from the integer set, an integer corresponding to the minimum value $C_k$.

With reference to the seventeenth possible implementation of the second aspect, in a twenty-first possible implementation, the level scale table obtaining module includes a range determining submodule configured to determine a value range of the quantization regulation factor from multiple preset value ranges, where each value range corresponds to a level scale table, and a level scale table obtaining submodule configured to obtain a level scale table corresponding to the value range of the quantization regulation factor determined by the range determining submodule.

According to a third aspect of the embodiments of the present disclosure, a decoding device is provided, including a processor, a memory, and a communications bus, where the memory is configured to store a program, the processor invokes the program stored in the memory, to perform the following steps determining, using division information, a unit size of a to-be-processed unit corresponding to a first transform coefficient set, where the first transform coefficient set and the division information are generated by performing entropy decoding on a code stream, determining a quantization regulation factor for the first transform coefficient set according to a first preset algorithm and the unit size of the to-be-processed unit, where with the first preset algorithm, the quantization regulation factor decreases progressively with a value of the unit size of the to-be-processed unit, and performing dequantization processing on a transform coefficient in the first transform coefficient set according to a second preset algorithm using the quantization regulation factor to obtain a second transform coefficient set.

In view of this, beneficial effects of the present disclosure are as follows.

According to the transform coefficient dequantization method disclosed in the present disclosure, the unit size of the to-be-processed unit corresponding to the first transform coefficient set is determined using the division information, the quantization regulation factor for the first transform coefficient set is adaptively determined based on a strong correlation between the unit size of the to-be-processed unit and image complexity and according to the unit size of the to-be-processed unit, and dequantization processing is performed on the transform coefficient in the first transform coefficient set using the quantization regulation factor. Based on the transform coefficient dequantization method disclosed in the present disclosure, the decoding device adaptively determines the quantization regulation factor for the first transform coefficient set according to the unit size of the to-be-processed unit, and then performs dequantization processing on the transform coefficient in the first transform coefficient set using the determined quantization regulation factor. The code stream sent by the coding device does not need to carry quantization step size regulation information, and therefore coding efficiency can be improved.

BRIEF DESCRIPTION OF DRAWINGS

To describe the technical solutions in the embodiments of this application more clearly, the following briefly introduces the accompanying drawings required for describing the embodiments. The accompanying drawings in the following description show merely the embodiments of this application, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A transform coefficient dequantization method and apparatus according to the present disclosure are applied to a decoding device that uses the HEVC standard. In the HEVC standard, a block structure includes a coding unit, a predicting unit, and a transform unit. The coding unit is a block of a size of 2N×2N. Each coding unit may be divided into four smaller coding units recursively until a predetermined smallest size is reached (for example, 8 pixels×8 pixels). Each coding unit includes one or more predicting units of variable sizes. Division of a predicting unit may include symmetric division and asymmetric division. Each coding unit includes one or more transform units. Each transform unit may be divided into four smaller transform units recursively until a predetermined smallest size is reached (for example, 4 pixels×4 pixels).

Based on the transform coefficient dequantization method and apparatus according to the present disclosure, the decoding device can adaptively determine a quantization regulation factor, to complete a transform coefficient dequantization process. A code stream sent by a coding device does not need to carry quantization step size regulation information, thereby improving coding efficiency. The coding efficiency is a ratio of a quantity of information code elements to a code length, and is also referred to as a code rate.

Figure 1:
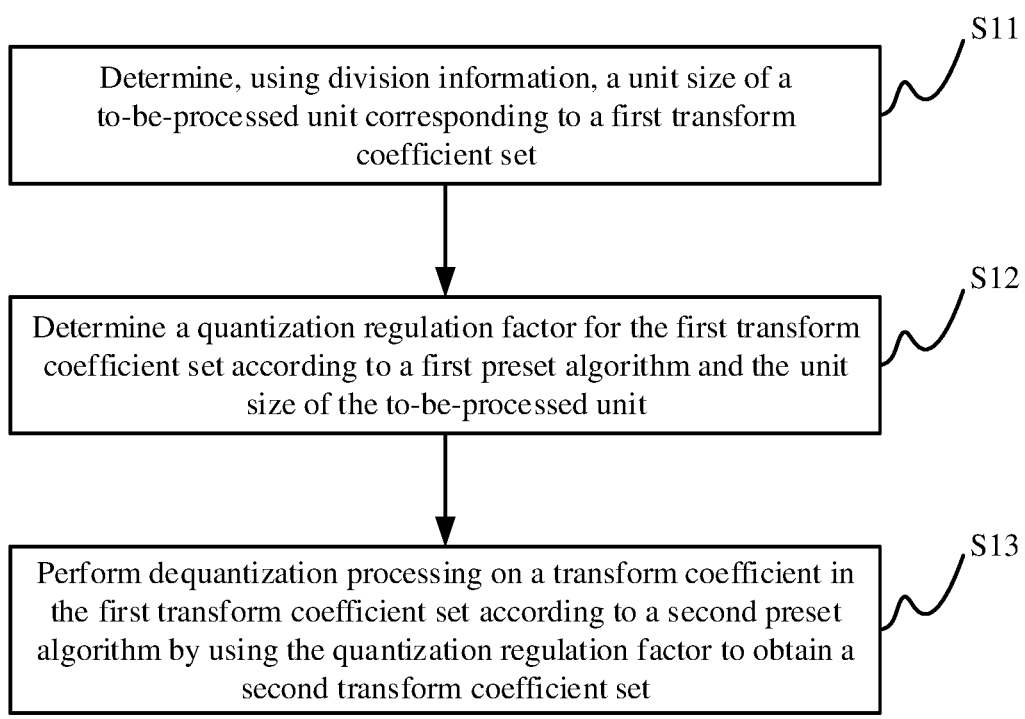
FIG. 1 is a flowchart of a transform coefficient dequantization method according to the present disclosure.

Referring to FIG. 1, FIG. 1 is a flowchart of a transform coefficient dequantization method according to the present disclosure. The method includes the following steps.

Step S11. Determine, using division information, a unit size of a to-be-processed unit corresponding to a first transform coefficient set, where the first transform coefficient set is generated by performing entropy decoding on a code stream, and the division information is generated by performing entropy decoding on the code stream.

The first transform coefficient set includes N transform coefficients A(i), where i=1, 2, . . . , or N, and N is a positive integer, for example, N=1, 2, 4, 16, 32, 50, 64, 81, 128, 512, or 1024. A transform coefficient in the first transform coefficient set is a residual transform coefficient generated during intra-frame predictive coding, or may be a residual transform coefficient generated during inter-frame predictive coding.

Further, the transform coefficient in the first transform coefficient set is a transform coefficient of any signal component of a video signal, for example, a transform coefficient of a luminance component, a transform coefficient of a chrominance component, a transform coefficient of a red (R) component, a transform coefficient of a green (G) component, or a transform coefficient of a blue (B) component. It should be noted that the first transform coefficient set may include all transform coefficients of a transform block, or may include some transform coefficients of a transform block, for example, a direct current coefficient of a transform block, or a group of low frequency coefficients of a transform block, or a group of high frequency coefficients of a transform block, or a group of direct current coefficients and a group of high frequency coefficients of a transform block, or first several coefficients in a coefficient scanning sequence.

Step S12. Determine a quantization regulation factor for the first transform coefficient set according to a first preset algorithm and the unit size of the to-be-processed unit, where with the first preset algorithm, the quantization regulation factor decreases progressively with the size of the to-be-processed unit.

In a coding process, and in particular, in an intra-frame coding process, a complex region is usually divided into blocks of a relatively small size to perform coding, and a flat region is usually divided into blocks of a relatively large size to perform coding. That is, there is a strong correlation between a size of a block in an image and complexity of the image in the block.

After the unit size of the to-be-processed unit is determined, the quantization regulation factor for the first transform coefficient set may be determined according to the unit size of the to-be-processed unit. The quantization regulation factor for the first transform coefficient set decreases progressively with the unit size of the to-be-processed unit. That is, the quantization regulation factor for the first transform coefficient set decreases along with an increase of the unit size of the to-be-processed unit.

Step S13. Perform dequantization processing on a transform coefficient in the first transform coefficient set according to a second preset algorithm using the quantization regulation factor to obtain a second transform coefficient set.

A decoding device adaptively derives the quantization regulation factor for the first transform coefficient set based on a strong correlation between the unit size of the to-be-processed unit and image complexity, and performs dequantization processing on the transform coefficient in the first transform coefficient set using the quantization regulation factor to obtain the second transform coefficient set.

According to the transform coefficient dequantization method disclosed in the present disclosure, the unit size of the to-be-processed unit corresponding to the first transform coefficient set is determined using the division information, the quantization regulation factor for the first transform coefficient set is adaptively determined based on the strong correlation between the unit size of the to-be-processed unit and the image complexity and according to the unit size of the to-be-processed unit, and dequantization processing is performed on the transform coefficient in the first transform coefficient set using the quantization regulation factor. Based on the transform coefficient dequantization method disclosed in the present disclosure, the decoding device adaptively determines the quantization regulation factor for the first transform coefficient set according to the unit size of the to-be-processed unit, and then performs dequantization processing on the transform coefficient in the first transform coefficient set using the determined quantization regulation factor. A code stream sent by the coding device does not need to carry quantization step size regulation information, and therefore coding efficiency can be improved.

In specific implementation, the to-be-processed unit corresponding to the first transform coefficient set has multiple forms, which are described separately in the following.

In an implementation, the to-be-processed unit corresponding to the first transform coefficient set is a first transform unit. A transform coefficient of the first transform unit includes the transform coefficient in the first transform coefficient set.

In this case, determining, using division information, a unit size of a to-be-processed unit corresponding to a first transform coefficient set includes determining a size of the first transform unit using the division information, and determining the size of the first transform unit as the unit size of the to-be-processed unit.

In another implementation, the to-be-processed unit corresponding to the first transform coefficient set is a first transform unit and a first coding unit. The first coding unit is a smallest coding unit including the first transform unit. For example, a coding unit of 32 pixels×32 pixels is divided into four coding units of 16 pixels×16 pixels, and one of the coding units of 16 pixels×16 pixels is divided into four transform units of 8 pixels×8 pixels. If the first transform unit is a transform unit of 8 pixels×8 pixels, the first coding unit is a coding unit of 16 pixels×16 pixels in which the transform unit of 8 pixels×8 pixels is.

In this case, determining, using division information, a unit size of a to-be-processed unit corresponding to a first transform coefficient set includes determining a size of the first transform unit using the division information, determining a size of the first coding unit using the division information, and determining the size of the first coding unit as the unit size of the to-be-processed unit when the size of the first coding unit is greater than a first threshold, or determining the size of the first transform unit as the unit size of the to-be-processed unit when the size of the first coding unit is less than or equal to a first threshold. The first threshold is, for example, 8, 12, 16, or 32.

In another implementation, the to-be-processed unit corresponding to the first transform coefficient set is a first transform unit and a first predicting unit. The first predicting unit is a predicting unit whose overlapping region is largest in predicting units that overlap with the first transform unit.

Further, if the first transform unit is covered by only one predicting unit, there is only one predicting unit that overlaps with the first transform unit, and the predicting unit is the first predicting unit. If the first transform unit overlaps with multiple predicting units, a predicting unit whose overlapping region is largest in the predicting units that overlap with the first transform unit is the first predicting unit. If the first transform unit overlaps with multiple predicting units, and there are two predicting units whose areas of overlapping regions in which the two predicting units overlap with the first transform unit are the same and largest, either of the two predicting units is used as the first predicting unit.

Figure 2:
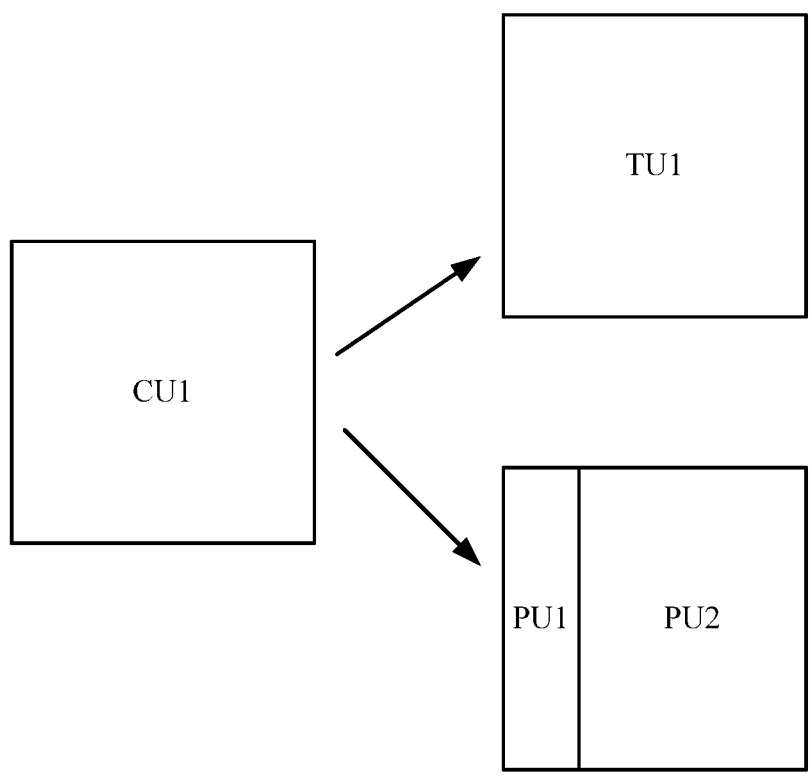
FIG. 2 is a schematic diagram of a division manner of a coding unit.

Herein, descriptions are provided with reference to FIG. 2. An entire coding unit (designated as CU1) of 16 pixels×16 pixels is divided into one transform unit of 16 pixels×16 pixels, where the transform unit is the first transform unit marked as TU1, and two predicting units (designated as PU1 and PU2), where the predicting unit PU1 is of 4 pixels×16 pixels, and the predicting unit PU2 is of 12 pixels×16 pixels. Predicting units that overlap with the first transform unit TU1 is the predicting unit PU1 and the predicting unit PU2, an area of an overlapping region between the predicting unit PU2 and the first transform unit TU1 is largest, and the predicting unit PU2 is the first predicting unit.

When the to-be-processed unit includes a first transform unit and a first predicting unit, determining, using division information, a unit size of a to-be-processed unit corresponding to a first transform coefficient set includes determining a size of the first transform unit using the division information, determining a size of the first predicting unit using the division information, and determining the size of the first predicting unit as the unit size of the to-be-processed unit when the size of the first predicting unit is greater than a second threshold, or determining the size of the first transform unit as the unit size of the to-be-processed unit when the size of the first predicting unit is less than or equal to a second threshold. The second threshold is, for example, 8, $8\sqrt{2}$, 16, $16\sqrt{2}$, or 32.

In another implementation, the to-be-processed unit corresponding to the first transform coefficient set is a first transform unit, a first coding unit, and a first predicting unit.

In this case, determining, using division information, a unit size of a to-be-processed unit corresponding to a first transform coefficient set includes determining a size of the first predicting unit using the division information, determining a size of the first coding unit using the division information, calculating an average of the size of the first predicting unit and the size of the first coding unit, and determining the average as the unit size of the to-be-processed unit when the average is greater than a third threshold, or determining, when the average is less than or equal to a third threshold, a size of the first transform unit using the division information, and determining the size of the first transform unit as the unit size of the to-be-processed unit. The third threshold is, for example, 8, 12, 16, or 32.

In addition, when the to-be-processed unit corresponding to the first transform coefficient set is a first transform unit, a first coding unit, and a first predicting unit, the unit size of the to-be-processed unit corresponding to the first transform coefficient set may be determined in the following manners using the division information determining a size of the first transform unit using the division information, determining a size of the first coding unit using the division information, determining a size of the first predicting unit using the division information, and calculating a weighted average of the size of the first transform unit, the size of the first coding unit, and the size of the first predicting unit, and determining the weighted average as the unit size of the to-be-processed unit.

During implementation, a weight of the size of the first coding unit may be set to be greater than a weight of the size of either the first transform unit or the first predicting unit. For example, the weight of the size of the first predicting unit is set to 0.25, the weight of the size of the first transform unit is 0.25, and the weight of the size of the first coding unit, is 0.5, or the weight of the size of the first predicting unit is set to 0.1, the weight of the size of the first transform unit is 0.3, and the weight of the size of the first coding unit, is 0.6, or the weight of the size of the first predicting unit is set to 0.3, the weight of the size of the first transform unit is 0.2, and the weight of the size of the first coding unit, is 0.5.

In another implementation, the to-be-processed unit corresponding to the first transform coefficient set is a first coding unit. In this case, determining, using division information, a unit size of a to-be-processed unit corresponding to a first transform coefficient set includes determining a size of the first coding unit using the division information, and determining the size of the first coding unit as the unit size of the to-be-processed unit.

In another implementation, the to-be-processed unit corresponding to the first transform coefficient set is a first predicting unit. In this case, determining, using division information, a unit size of a to-be-processed unit corresponding to a first transform coefficient set includes determining a size of the first predicting unit using the division information, and determining the size of the first predicting unit as the unit size of the to-be-processed unit.

In another implementation, the to-be-processed unit corresponding to the first transform coefficient set is a first coding unit and a first predicting unit. In this case, determining, using division information, a unit size of a to-be-processed unit corresponding to a first transform coefficient set includes determining a size of the first coding unit using the division information, determining a size of the first predicting unit using the division information, and determining the size of the first coding unit as the size of the to-be-processed unit when the size of the first coding unit is greater than a fourth threshold, or determining the size of the first predicting unit as the size of the to-be-processed unit when the size of the first coding unit is less than or equal to a fourth threshold. The fourth threshold is, for example, 8, 12, 16, or 32.

In this implementation of determining a unit size of a to-be-processed unit according to the present disclosure, the size of the first transform unit is a square root of a total quantity of pixels covered by the first transform unit, the size of the first coding unit is a square root of a total quantity of pixels covered by the first coding unit, and the size of the first predicting unit is a square root of a total quantity of pixels covered by the first predicting unit.

During specific implementation, if the first transform unit is rectangular, a width and height of the first transform unit are obtained, and a square root of a product of the width and height is used as the size of the first transform unit. If the first transform unit is square, only a width or height of the first transform unit needs to be obtained as the size of the first transform unit. If the first transform unit is non-rectangular, statistics about a total quantity of pixels covered by the first transform unit needs to be collected, and a square root of the total quantity of pixels is used as the size of the first transform unit.

If the first coding unit is rectangular, a width and height of the first coding unit are obtained, and a square root of a product of the width and height is used as the size of the first coding unit. If the first coding unit is a square, only a width or height of the first coding unit needs to be obtained as the size of the first coding unit.

If the first predicting unit is rectangular, a width and height of the first predicting unit are obtained, and a square root of a product of the width and height is used as the size of the predicting unit. If the first predicting unit is square, only a width or height of the first predicting unit needs to be obtained as the size of the first predicting unit.

In the transform coefficient dequantization method shown in FIG. 1 of the present disclosure, multiple manners may be used to determine the quantization regulation factor for the first transform coefficient set according to the first preset algorithm and the unit size of the to-be-processed unit. The following provides descriptions separately.

Manner 1: A formula $$QC = M_1^{(A_1 - \log_{N_1} Size)/K_1}$$

is used to calculate the quantization regulation factor for the first transform coefficient set, where QC is the quantization regulation factor for the first transform coefficient set, Size is the unit size of the to-be-processed unit, $N_1$ and $M_1$ are positive numbers that are not less than 1, and K1 and A1 are positive numbers.

Manner 2: A formula $$QC = \frac{a_1}{\log_{N_1} Size} + b_1$$

is used to calculate the quantization regulation factor for the first transform coefficient set, where QC is the quantization regulation factor for the first transform coefficient set, Size is the unit size of the to-be-processed unit, $N_1$ is a positive number that is not less than 1, and $a_1$ and $b_1$ are positive numbers.

Figure 3:
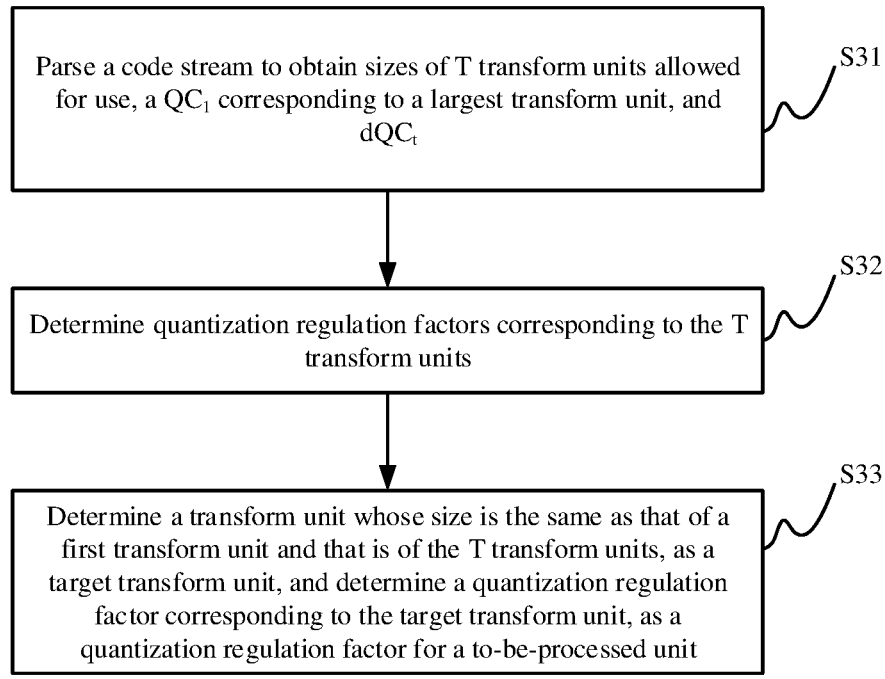
FIG. 3 is a flowchart of a method for determining a quantization regulation factor for a first transform coefficient set according to the present disclosure.

In addition, when the to-be-processed unit includes a first transform unit, a manner shown in FIG. 3 may be further used to determine the quantization regulation factor for the first transform coefficient set according to the first preset algorithm and the unit size of the to-be-processed unit, and the following steps are included.

Step S31. Parse the code stream to obtain sizes of T transform units allowed for use, a $QC_1$ corresponding to a largest transform unit, and $dQC_t$, where t=2, 3, . . . , or T, T is an integer greater than 3, for any two transform units at adjacent levels, a size of a transform unit at a lower level is greater than a size of another transform unit, and the $dQC_t$ is all or partially greater than 0.

Step S32. Determine, using the $QC_1$ corresponding to the largest transform unit and the $dQC_t$, quantization regulation factors corresponding to the T transform units.

Step S33. Determine a transform unit whose size is the same as that of the first transform unit and that is of the T transform units, as a target transform unit, and determine a quantization regulation factor corresponding to the target transform unit, as a quantization regulation factor for the to-be-processed unit.

Herein, an example is used for description.

The code stream is parsed to obtain sizes of five transform units allowed for use, the $QC_1$ corresponding to the largest transform unit, and the $dQC_t$, where t=2, 3, 4, or 5.

Then, quantization regulation factors corresponding to the five transform units are determined using the $QC_1$ corresponding to the largest transform unit and the $dQC_t$. Details are as follows. A quantization regulation factor corresponding to a second-level transform unit is $QC_2=QC_1+dQC_2$, a quantization regulation factor corresponding to a third-level transform unit is $QC_3=QC_2+dQC_3$, a quantization regulation factor corresponding to a fourth-level transform unit is $QC_4=QC_3+dQC_4$, and a quantization regulation factor corresponding to a fifth-level transform unit is $QC_5=QC_4+dQC_5$, where $QC_1$, $dQC_2$, $dQC_3$, $dQC_4$, and $dQC_5$ are all known quantities, and therefore, the quantization regulation factors corresponding to the five transform units can be determined.

Then, the size of the first transform unit is compared with the sizes of the foregoing five transform units. Assuming that the size of the first transform unit is the same as the size of the third-level transform unit, the quantization regulation factor for the to-be-processed unit is determined as $QC_3$.

During implementation, when the to-be-processed unit is a first coding unit, the following manner may be further used to determine the quantization regulation factor for the first transform coefficient set according to the first preset algorithm and the unit size of the to-be-processed unit parsing the code stream to obtain sizes of P coding units allowed for use, a $QC_1$ corresponding to a largest coding unit, and $dQC_p$, where p=2, 3, . . . , or P, P is an integer greater than 3, for any two coding units at adjacent levels, a size of a coding unit at a smaller level is greater than a size of another coding unit, and the $dQC_p$ is all or partially greater than 0, determining, using the $QC_1$ corresponding to the largest coding unit and the $dQC_p$, quantization regulation factors corresponding to the P coding units, determining a coding unit whose size is the same as that of the first coding unit and that is of the P coding units, as a target coding unit, and determining a quantization regulation factor corresponding to the target coding unit, as a quantization regulation factor for the to-be-processed unit.

During implementation, when the to-be-processed unit is a first predicting unit, the following manner may be further used to determine the quantization regulation factor for the first transform coefficient set according to the first preset algorithm and the unit size of the to-be-processed unit parsing the code stream to obtain sizes of Z predicting units allowed for use, a $QC_1$ corresponding to a largest predicting unit, and $dQC_z$, where z=2, 3, . . . , or Z, Z is an integer greater than 3, for any two predicting units at adjacent levels, a size of a predicting unit at a smaller level is greater than a size of another predicting unit, and the $dQC_z$ is all or partially greater than 0, determining, using the $QC_1$ corresponding to the largest predicting unit and the $dQC_z$, quantization regulation factors corresponding to the Z predicting units, and determining a predicting unit whose size is the same as that of the first predicting unit and that is of the Z predicting units, as a target predicting unit, and determining a quantization regulation factor corresponding to the target predicting unit, as a quantization regulation factor for the to-be-processed unit.

In the transform coefficient dequantization method shown in FIG. 1 of the present disclosure, multiple manners may be used to perform dequantization processing on a transform coefficient in the first transform coefficient set according to the second preset algorithm using the quantization regulation factor. The following provides descriptions separately.

Manner 1: Dequantization processing is performed on each transform coefficient in the first transform coefficient set using a formula R(i)=sign{A(i)}·round{A(i)·Qs(i)·QC+ o2(i)}, where i=1, 2, . . . , or N, N is a quantity of transform coefficients included in the first transform coefficient set, A(i) is an $i^{th}$ transform coefficient in the first transform coefficient set, Qs(i) is an original quantization step size corresponding to the $i^{th}$ transform coefficient in the first transform coefficient set, QC is the quantization regulation factor, o2(i) is a roundoff bias corresponding to the $i^{th}$ transform coefficient in the first transform coefficient set, and R(i) is an $i^{th}$ transform coefficient in the second transform coefficient set.

In addition, in the foregoing formula, sign{X} represents taking a sign of X, that is, $$\text{sign}\{X\} = \begin{cases} 1, & X \geq 0 \\ -1, & X < 0 \end{cases},$$

round{X} is a rounding operation, and a value of o2(i) further determines whether rounding down, rounding off, or rounding up is performed. For example, when o2(i) is 0.5, round{X} includes rounding off, when o2(i) is 1, round{X} includes rounding o2(i) is 0.5, rounding off, when o2(i) is 1, rounding up, when o2(i) is 0, round{X} includes rounding down.

An original quantization step size corresponding to a transform coefficient in a first transform coefficient set is a quantization step size corresponding to a quantization parameter of the first transform unit or the first coding unit corresponding to the first transform coefficient set, for example, the corresponding quantization step size is 1 when the quantization parameter is 4. Generally, a quantization parameter of a coding unit may be obtained by parsing a code stream, and a quantization parameter of a coding unit in which the transform unit is may be used as a quantization parameter of a transform unit, or a quantization parameter of a transform unit may be obtained by modifying a quantization parameter of a coding unit according to quantization parameter information in the code stream. Herein, it should be noted that original quantization step sizes corresponding to transform coefficients in the first transform coefficient set may be the same, or may be different.

In manner 1, scaling is performed, using the quantization regulation factor, on an original quantization step size corresponding to each transform coefficient in the first transform coefficient set, and then, dequantization is performed, using a quantization step size obtained after scaling, on a corresponding transform coefficient in the first transform coefficient set.

Manner 2: Rounding processing is performed on a quantization regulation factor, rounding processing is performed on an original quantization step size corresponding to each transform coefficient in the first transform coefficient set, and dequantization processing is performed on each transform coefficient in the first transform coefficient set using formula 1.

Formula 1 is:

$$R(i) = \text{sign}\{A(i)\} \cdot (A(i) \cdot QC' + (1 << (\text{bdshift}-1+\text{delta}))) >> (\text{bdshift}+\text{delta}),$$

where i=1, 2, . . . , or N, N is a quantity of transform coefficients included in the first transform coefficient set, A(i) is an $i^{th}$ transform coefficient in the first transform coefficient set, Qs'(i) is a result generated after rounding processing is performed on the original quantization step size corresponding to the $i^{th}$ transform coefficient in the first transform coefficient set, QC' is the quantization regulation factor that is after the rounding processing, bdshift is a bit shift amount, delta is an additional bit shift amount, << is a left shift operator, >> is a right shift operator, and R(i) is an $i^{th}$ transform coefficient in the second transform coefficient set.

During implementation, rounding process performed on the quantization regulation factor and the original quantization step size corresponding to each transform coefficient in the first transform coefficient set may be rounding up, rounding down, or rounding off.

In manner 2, rounding process is performed on both the quantization regulation factor and the original quantization step size corresponding to each transform coefficient in the first transform coefficient set, and then, scaling is performed, using the quantization regulation factor that is after rounding processing, on a quantization step size that is after each transform coefficient undergoes rounding processing, and dequantization processing is performed, using the quantization step size that is after scaling, on the transform coefficient in the first transform coefficient set.

Manner 3: Dequantization processing is performed on each transform coefficient in the first transform coefficient set using a formula $B(i) = \text{sign}\{A(i)\} \cdot \text{round}\{A(i) \cdot Qs(i) + o4(i)\}$ to obtain a third transform coefficient set, and scaling processing and rounding processing are performed on each transform coefficient in a third transform coefficient set using a formula $R(i) = \text{sign}\{B(i)\} \cdot \text{round}\{B(i) \cdot QC + o5(i)\}$ to obtain the second transform coefficient set, where i=1, 2, . . . , or N, N is a quantity of transform coefficients included in the first transform coefficient set, A(i) is an $i^{th}$ transform coefficient in the first transform coefficient set, Qs(i) is an original quantization step size corresponding to the $i^{th}$ transform coefficient in the first transform coefficient set, o4(i) is a roundoff bias corresponding to the $i^{th}$ transform coefficient in the first transform coefficient set, B(i) is an $i^{th}$ transform coefficient in the third transform coefficient set, QC is the quantization regulation factor, o5(i) is a roundoff bias corresponding to the $i^{th}$ transform coefficient in the third transform coefficient set, and R(i) is an $i^{th}$ transform coefficient in the second transform coefficient set, where values of o4(i) and o5(i) determine whether a rounding operation includes rounding down, rounding off, or rounding up.

In manner 3, dequantization processing is performed on each transform coefficient using the original quantization step size of each transform coefficient in the first transform coefficient set, and then scaling processing is performed, using the quantization regulation factor, on each transform coefficient that is obtained by means of dequantization processing.

Figure 4:
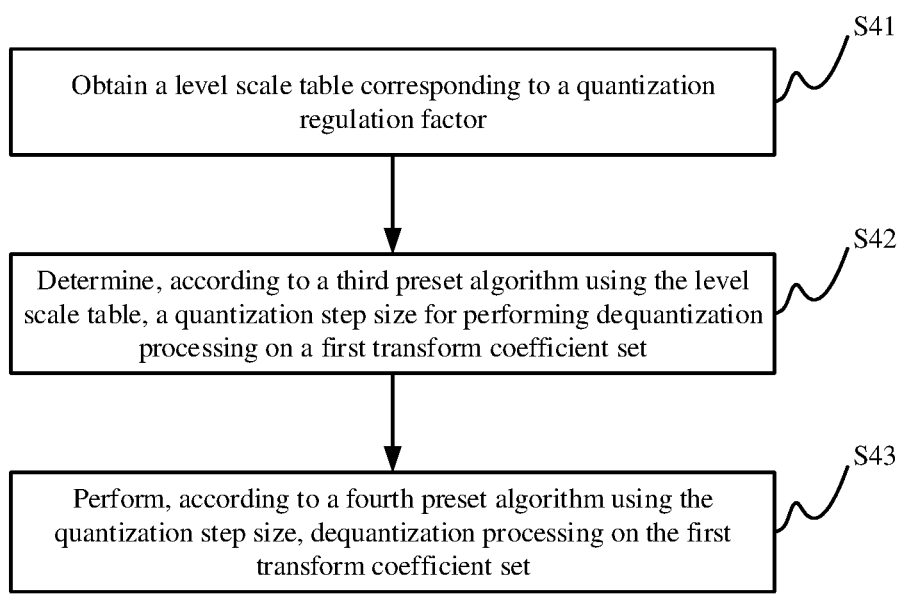
FIG. 4 is a flowchart of a method for performing dequantization processing on a transform coefficient in a first transform coefficient set according to a second preset algorithm using a quantization regulation factor according to the present disclosure.

Manner 4: Referring to FIG. 4, FIG. 4 is a flowchart of a method for performing dequantization processing on a transform coefficient in the first transform coefficient set according to the second preset algorithm using the quantization regulation factor according to the present disclosure. The method includes the following steps.

Step S41. Obtain a level scale table corresponding to the quantization regulation factor.

During implementation, multiple manners may be used to obtain the level scale table corresponding to the quantization regulation factor. The following provides detailed descriptions. The level scale table includes multiple level scale values, for example, six level scale values {40,45,51,57,64,72} or eight level scale values {108,118,128,140,152,166,181,197}.

Step S42. Determine, according to a third preset algorithm using the level scale table, a quantization step size for performing dequantization processing on the first transform coefficient set.

A quantization step size $Qs''(i)$ for performing dequantization processing on the first transform coefficient set is calculated using a formula:

$$Qs''(i)=m(i)\cdot l(i),$$

$m(i)$ is a scaling factor and can be obtained by parsing a code stream, and $l(i)$ is a function about a level scale value and a quantization parameter:

$$l(i)=\text{levelScale}[QP\%N]<<\lfloor QP/N\rfloor,$$

levelScale[K] represents the $K^{th}$ level scale value in the level scale table, $\lfloor QP/N\rfloor$ represents dividing QP, i.e. quantization parameter, by N and rounding down, % is a rem operation, << is a left shift operator, and N is a quantity of level scale values in the level scale table, and when the level scale table includes six level scale values, $l(i)=\text{levelScale}[QP\%6]<<\lfloor QP/6\rfloor$, or when the level scale table includes eight level scale values, $l(i)=\text{levelScale}[QP\%8]<<\lfloor QP/8\rfloor$.

Step S43. Perform, according to a fourth preset algorithm using the quantization step size, dequantization processing on the first transform coefficient set.

After the quantization step size is determined in step S41 and step S42, dequantization processing may be performed on the first transform coefficient set in any existing manner to obtain the second transform coefficient set.

For example, dequantization processing is performed on each transform coefficient in the first transform coefficient set using a formula $R(i)=\text{sign}\{A(i)\}\cdot\text{round}\{A(i)\cdot Qs''(i)+o6(i)\}$, where $i=1, 2, \ldots$, or N, N is a quantity of transform coefficients included in the first transform coefficient set, $A(i)$ is an $i^{th}$ transform coefficient in the first transform coefficient set, $Qs''(i)$ is a quantization step size corresponding to the $i^{th}$ transform coefficient in the first transform coefficient set, $o6(i)$ is a roundoff bias corresponding to the $i^{th}$ transform coefficient in the first transform coefficient set, and $R(i)$ is an $i^{th}$ transform coefficient in the second transform coefficient set.

In the method shown in FIG. 4, the following manners may be used to obtain the level scale table corresponding to the quantization regulation factor.

Manner 1: M level scale values in a preset level scale table are separately multiplied by the quantization regulation factor, and rounding processing is performed on M products separately to obtain a level scale table for performing dequantization processing on the first transform coefficient set.

That is, each level scale value in the preset level scale table is multiplied by the QC and rounding is performed to obtain a new level scale table. The level scale table is used to perform dequantization processing on the first transform coefficient set. During implementation, rounding processing separately performed on the M products may be rounding up, rounding down, or rounding off.

Manner 2: A value range of the quantization regulation factor is determined from multiple preset value ranges, where each value range corresponds to one level scale table, and a level scale table corresponding to the value range of the quantization regulation factor is obtained.

During implementation, the value range of the quantization regulation factor is divided into H1 value ranges in advance, and each value range corresponds to one preset level scale table. The calculated value range of the quantization regulation factor is searched for, and the level scale table corresponding to the value range is selected. The level scale table is used as a level scale table for performing dequantization processing on the first transform coefficient set.

Both Table 1 and Table 2 show a mapping relationship between a quantization regulation factor and a level scale table.

TABLE 1

| | Level scale table |
|---|---|
| QC ≥ 1.5 | {60, 68, 77, 86, 96, 108} |
| 1.2 < QC < 1.5 | {54, 61, 69, 77, 86, 97} |
| 0.8 ≤ QC ≤ 1.2 | {40, 45, 51, 57, 64, 72} |
| 0.6 < QC < 0.8 | {28, 32, 36, 40, 45, 50} |
| QC ≤ 0.6 | {24, 27, 31, 34, 38, 43} |

TABLE 2

| | Level scale table |
|---|---|
| $QC = 2^{-1}$ | {20, 23, 26, 29, 32, 36} |
| $QC = 2^{-3/4}$ | {24, 27, 30, 34, 38, 43} |
| $QC = 2^{-1/2}$ | {28, 32, 36, 40, 45, 51} |
| $QC = 2^{-1/4}$ | {34, 38, 43, 48, 54, 61} |
| $QC = 1$ | {40, 45, 51, 57, 64, 72} |
| $QC = 2^{1/4}$ | {48, 54, 61, 68, 76, 86} |
| $QC = 2^{1/2}$ | {57, 64, 72, 81, 91, 102} |

Manner 3: M level scale values in a preset level scale table are separately multiplied by the quantization regulation factor, rounding processing is performed on M products separately to obtain M intermediate values, M integer sets are determined, where an $m^{th}$ integer set uses an $m^{th}$ intermediate value as a center, and $m=1, 2, \ldots$, or M, and an integer is selected from each of the M integer sets according to a preset rule to form a level scale table for performing dequantization processing on the first transform coefficient set.

During implementation, rounding processing separately performed on the M products may be rounding up, rounding down, or rounding off. In addition, the following manner may be used to select an integer from one integer set according to the preset rule calculating, using formulas $B_{j,1}=\lfloor 2^P/D_j\rfloor$ and $B_{j,2}=\lceil 2^P/D_j\rceil$, a first intermediate value $B_{j,1}$ and a second intermediate value $B_{j,2}$ corresponding to each integer in the integer set, where P is an integer greater than 1, Dj is a $j^{th}$ integer in the integer set, $j=1, 2, \ldots$, or J, and J is a quantity of integers included in the integer set, calculating, using a formula $C_j=\min(|D_j\cdot B_{j,1}-2^P|,|D_j\cdot B_{j,2}-2^P|)$, a third intermediate value $C_j$ corresponding to each integer in the integer set, and determining a minimum value $C_k$ in the third intermediate values $C_j$, and selecting, from the integer set, an integer corresponding to the minimum value $C_k$.

$\lfloor\ \rfloor$ represents rounding down, $\lceil\ \rceil$ represents rounding up, and min(Y,Z) represents selecting a smaller number between Y and Z. Certainly, another rule may alternatively be used to select an integer from an integer set.

The present disclosure further discloses a transform coefficient dequantization apparatus. For the following transform coefficient dequantization apparatus, refer to the foregoing transform coefficient dequantization method correspondingly.

Figure 5:
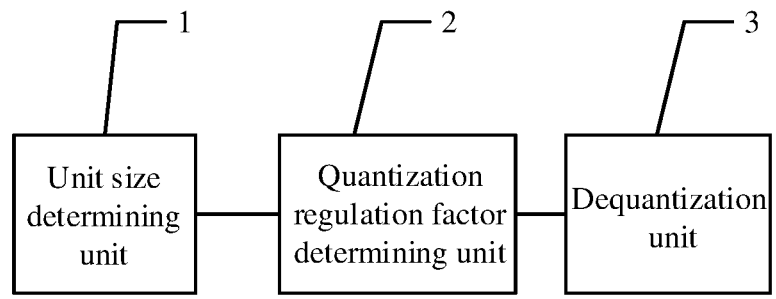
FIG. 5 is a schematic structural diagram of a transform coefficient dequantization apparatus according to the present disclosure.

Referring to FIG. 5, FIG. 5 is a schematic structural diagram of a transform coefficient dequantization apparatus according to the present disclosure. The apparatus includes a unit size determining unit 1, a quantization regulation factor determining unit 2, and a dequantization unit 3.

The unit size determining unit 1 is configured to determine, using division information, a unit size of a to-be-processed unit corresponding to a first transform coefficient set. The first transform coefficient set and the division information are generated by performing entropy decoding on a code stream.

The quantization regulation factor determining unit 2 is configured to determine a quantization regulation factor for the first transform coefficient set according to a first preset algorithm and the unit size of the to-be-processed unit that is determined by the unit size determining unit 1. With the first preset algorithm, the quantization regulation factor decreases progressively with a value of the unit size of the to-be-processed unit.

The dequantization unit 3 is configured to perform dequantization processing on a transform coefficient in the first transform coefficient set according to a second preset algorithm using the quantization regulation factor determined by the quantization regulation factor determining unit 2 to obtain a second transform coefficient set.

According to the transform coefficient dequantization apparatus disclosed in the present disclosure, the unit size determining unit 1 determines, using the division information, the unit size of the to-be-processed unit corresponding to the first transform coefficient set, the quantization regulation factor determining unit 2 adaptively determines the quantization regulation factor for the first transform coefficient set according to the unit size of the to-be-processed unit and based on a strong correlation between the unit size of the to-be-processed unit and image complexity, and the dequantization unit 3 performs dequantization processing on the transform coefficient in the first transform coefficient set using the quantization regulation factor. Based on the transform coefficient dequantization apparatus disclosed in the present disclosure, a decoding device adaptively determines the quantization regulation factor for the first transform coefficient set according to the unit size of the to-be-processed unit, and then performs dequantization processing on the transform coefficient in the first transform coefficient set using the determined quantization regulation factor. The code stream sent by the coding device does not need to carry quantization step size regulation information, and therefore coding efficiency can be improved.

During specific implementation, the to-be-processed unit corresponding to the first transform coefficient set has multiple forms, and correspondingly, the unit size determining unit 1 has multiple structures.

In an implementation, the to-be-processed unit corresponding to the first transform coefficient set is a first transform unit. Correspondingly, the unit size determining unit 1 includes a first size determining module configured to determine a size of the first transform unit using the division information, and a first processing module configured to determine the size of the first transform unit that is determined by the first size determining module, as the unit size of the to-be-processed unit.

In another implementation, the to-be-processed unit corresponding to the first transform coefficient set is a first transform unit and a first coding unit. Correspondingly, the unit size determining unit 1 includes a first size determining module configured to determine a size of the first transform unit using the division information, a second size determining module configured to determine a size of the first coding unit using the division information, and a second processing module configured to determine the size of the first coding unit that is determined by the second size determining module, as the unit size of the to-be-processed unit when the size of the first coding unit is greater than a first threshold or determine the size of the first transform unit that is determined by the first size determining module, as the unit size of the to-be-processed unit when the size of the first coding unit is less than or equal to the first threshold. The first threshold is, for example, 8, 12, 16, or 32.

In another implementation, the to-be-processed unit corresponding to the first transform coefficient set is a first transform unit and a first predicting unit. Correspondingly, the unit size determining unit 1 includes a first size determining module configured to determine a size of the first transform unit using the division information, a third size determining module configured to determine a size of the first predicting unit using the division information, and a third processing module configured to determine the size of the first predicting unit as the unit size of the to-be-processed unit when the size of the first predicting unit that is determined by the third size determining module is greater than a second threshold or determine the size of the first transform unit as the unit size of the to-be-processed unit when the size of the first predicting unit that is determined by the third size determining module is less than or equal to the second threshold. The second threshold is, for example, 8, 8 $\sqrt{2}$, 16, 16$\sqrt{2}$, or 32.

In another implementation, the to-be-processed unit includes a first transform unit, a first coding unit, and a first predicting unit. Correspondingly, the unit size determining unit 1 includes a first size determining module configured to determine a size of the first transform unit using the division information, a second size determining module configured to determine a size of the first coding unit using the division information, a third size determining module configured to determine a size of the first predicting unit using the division information, an average calculation module configured to calculate an average of the size of the first predicting unit and the size of the first coding unit, and a fourth processing module configured to determine the average as the unit size of the to-be-processed unit when the average calculated by the average calculation module is greater than a third threshold or determine the size of the first transform unit that is determined by the first size determining module, as the unit size of the to-be-processed unit when the average calculated by the average calculation module is less than or equal to a third threshold. The third threshold is, for example, 8, 12, 16, or 32.

When the to-be-processed unit includes a first transform unit, a first coding unit, and a first predicting unit, the unit size determining unit 1 may alternatively be of the following structure including a first size determining module configured to determine a size of the first transform unit using the division information, a second size determining module configured to determine a size of the first coding unit using the division information, a third size determining module configured to determine a size of the first predicting unit using the division information, and a fifth processing module configured to calculate a weighted average of the size of the first transform unit, the size of the first coding unit, and the size of the first predicting unit, and determine the weighted average as the unit size of the to-be-processed unit.

In another implementation, the to-be-processed unit is a first coding unit. Correspondingly, the unit size determining unit 1 includes a second size determining module configured to determine a size of the first coding unit using the division information, and a sixth processing module configured to determine the size of the first coding unit that is determined by the second size determining module, as the size of the to-be-processed unit.

In another implementation, the to-be-processed unit corresponding to the first transform coefficient set is a first predicting unit. Correspondingly, the unit size determining unit 1 includes a third size determining module configured to determine a size of the first predicting unit using the division information, and a seventh processing module configured to determine the size of the first predicting unit that is determined by the third size determining module, as the size of the to-be-processed unit.

In another implementation, the to-be-processed unit corresponding to the first transform coefficient set is a first coding unit and a first predicting unit. Correspondingly, the unit size determining unit 1 includes a second size determining module configured to determine a size of the first coding unit using the division information, a third size determining module configured to determine a size of the first predicting unit using the division information, and an eighth processing unit configured to determine the size of the first coding unit as the size of the to-be-processed unit when the size of the first coding unit that is determined by the second size determining module is greater than a fourth threshold or determine the size of the first predicting unit as the size of the to-be-processed unit when the size of the first coding unit that is determined by the second size determining module is less than or equal to a fourth threshold. The fourth threshold is, for example, 8, 12, 16, or 32.

In the transform coefficient dequantization apparatus shown in FIG. 5 of the present disclosure, the quantization regulation factor determining unit 2 may use multiple manners to determine the quantization regulation factor for the first transform coefficient set according to the first preset algorithm and the unit size of the to-be-processed unit. Correspondingly, the quantization regulation factor determining unit 2 has multiple structures.

In an implementation, the quantization regulation factor determining unit 2 includes a first quantization regulation factor determining module. The first quantization regulation factor determining module calculates the quantization regulation factor for the first transform coefficient set using a formula $$QC = M_1^{(A_1 - \log_{N_1} Size)/K_1},$$

where QC is the quantization regulation factor for the first transform coefficient set, Size is the unit size of the to-be-processed unit, $N_1$ and $M_1$ are positive numbers that are not less than 1, and $K_1$ and $A_1$ are positive numbers.

In another implementation, the quantization regulation factor determining unit 2 includes a second quantization regulation factor determining module. The second quantization regulation factor determining module calculates the quantization regulation factor for the first transform coefficient set using a formula $$QC = \frac{a_1}{\log_{N_1} Size} + b_1,$$

where QC is the quantization regulation factor for the first transform coefficient set, Size is the unit size of the to-be-processed unit, $N_1$ is a positive number that is not less than 1, and $a_1$ and $b_1$ are positive numbers.

When the to-be-processed unit includes a first transform unit, the quantization regulation factor determining unit 2 may further be of the following structure including a first parsing module, a first calculation module, and a third quantization regulation factor determining module.

The first parsing module is configured to parse the code stream to obtain sizes of T transform units allowed for use, a $QC_1$ corresponding to a largest transform unit, and $dQC_t$, where t=2, 3, . . . , or T, T is an integer greater than 3, for any two transform units at adjacent levels, a size of a transform unit at a lower level is greater than a size of another transform unit, and the $dQC_t$ is all or partially greater than 0.

The first calculation module is configured to determine, using the $QC_1$ corresponding to the largest transform unit and the $dQC_t$, quantization regulation factors corresponding to the T transform units.

The third quantization regulation factor determining module is configured to determine a transform unit whose size is the same as that of the first transform unit and that is of the T transform units, as a target transform unit, and determine a quantization regulation factor corresponding to the target transform unit, as a quantization regulation factor for the to-be-processed unit.

In addition, when the to-be-processed unit is a first coding unit, the quantization regulation factor determining unit 2 may be further of the following structure including a second parsing module, a second calculation module, and a fourth quantization regulation factor determining module.

The second parsing module is configured to parse the code stream to obtain sizes of P coding units allowed for use, a $QC_1$ corresponding to a largest coding unit, and $dQC_p$, where p=2, 3, . . . , or P, P is an integer greater than 3, for any two coding units at adjacent levels, a size of a coding unit at a smaller level is greater than a size of another coding unit, and the $dQC_p$ is all or partially greater than 0.

The second calculation module is configured to determine, using the $QC_1$ corresponding to the largest coding unit and the $dQC_p$, quantization regulation factors corresponding to the P coding units.

The fourth quantization regulation factor determining module is configured to determine a coding unit whose size is the same as that of the first coding unit and that is of the P coding units, as a target coding unit, and determine a quantization regulation factor corresponding to the target coding unit, as a quantization regulation factor for the to-be-processed unit.

In addition, when the to-be-processed unit is a first predicting unit, the quantization regulation factor determining unit 2 may be further of the following structure including a third parsing module, a third calculation module, and a fifth quantization regulation factor determining module.

The third parsing module is configured to parse the code stream to obtain sizes of Z predicting units allowed for use, a $QC_1$ corresponding to a largest predicting unit, and $dQC_z$, where z=2, 3, . . . , or Z, Z is an integer greater than 3, for any two predicting units at adjacent levels, a size of a predicting unit at a smaller level is greater than a size of another predicting unit, and the $dQC_z$ is all or partially greater than 0.

The third calculation module is configured to determine quantization regulation factors corresponding to the Z predicting units using the $QC_1$ corresponding to the largest predicting unit and the $dQC_z$.

The fifth quantization regulation factor determining module is configured to determine a predicting unit whose size is the same as that of the first predicting unit and that is of the Z predicting units, as a target predicting unit, and determine a quantization regulation factor corresponding to the target predicting unit as the quantization regulation factor for the to-be-processed unit.

In the transform coefficient dequantization apparatus shown in FIG. 5 of the present disclosure, the dequantization unit 3 may use multiple manners to perform dequantization processing on the transform coefficient in the first transform coefficient set according to the second preset algorithm using the quantization regulation factor. Correspondingly, the dequantization unit 3 has multiple structures.

In an implementation, the dequantization unit 3 includes a first dequantization module. The first dequantization module performs dequantization processing on each transform coefficient in the first transform coefficient set using a formula $R(i)=\text{sign}\{A(i)\}\cdot\text{round}\{A(i)\cdot Qs(i)\cdot QC+o2(i)\}$, where $i=1, 2, \ldots,$ or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, QC is the quantization regulation factor, $o2(i)$ is a roundoff bias corresponding to the $i^{th}$ transform coefficient in the first transform coefficient set, and $R(i)$ is an $i^{th}$ transform coefficient in the second transform coefficient set.

In another implementation, the dequantization unit 3 includes a first rounding processing module, a second rounding processing module, and a second dequantization module. The first rounding processing module is configured to perform rounding processing on the quantization regulation factor. The second rounding processing module is configured to perform rounding processing on an original quantization step size corresponding to each transform coefficient in the first transform coefficient set. The second dequantization module is configured to perform dequantization processing on each transform coefficient in the first transform coefficient set using a formula $R(i)=\text{sign}\{A(i)\}\cdot(A(i)\cdot Qs'(i)\cdot QC'+(1<<(bdshift-1+delta)))>>(bdshift+delta)$, where $i=1, 2, \ldots,$ or N, N is a quantity of transform coefficients included in the first transform coefficient set, $A(i)$ is an $i^{th}$ transform coefficient in the first transform coefficient set, $Qs'(i)$ is a result generated after rounding processing is performed on the original quantization step size corresponding to the $i^{th}$ transform coefficient in the first transform coefficient set, QC' is the quantization regulation factor that is after the rounding processing, bdshift is a bit shift amount, delta is an additional bit shift amount, << is a left shift operator, >> is a right shift operator, and $R(i)$ is an $i^{th}$ transform coefficient in the second transform coefficient set.

In another implementation, the dequantization unit 3 includes a third dequantization module and a transform coefficient processing module.

The third dequantization module is configured to perform dequantization processing on each transform coefficient in the first transform coefficient set using a formula $B(i)=\text{sign}\{A(i)\}\cdot\text{round}\{A(i)\cdot Qs(i)+o4(i)\}$ to obtain a third transform coefficient set. The transform coefficient processing module is configured to perform scaling processing and rounding processing on each transform coefficient in the third transform coefficient set using a formula $R(i)=\text{sign}\{B(i)\}\cdot\text{round}\{B(i)\cdot QC+o5(i)\}$ to obtain the second transform coefficient set, where $i=1, 2, \ldots,$ or N, N is a quantity of transform coefficients included in the first transform coefficient set, $A(i)$ is an $i^{th}$ transform coefficient in the first transform coefficient set, $Qs(i)$ is an original quantization step size corresponding to the $i^{th}$ transform coefficient in the first transform coefficient set, $o4(i)$ is a roundoff bias corresponding to the $i^{th}$ transform coefficient in the first transform coefficient set, $B(i)$ is an $i^{th}$ transform coefficient in the third transform coefficient set, QC is the quantization regulation factor, $o5(i)$ is a roundoff bias corresponding to the $i^{th}$ transform coefficient in the third transform coefficient set, and $R(i)$ is an $i^{th}$ transform coefficient in the second transform coefficient set.

In another implementation, the dequantization unit 3 includes a level scale table obtaining module, a quantization step size determining module, and a fourth dequantization module. The level scale table obtaining module is configured to obtain a level scale table corresponding to the quantization regulation factor. The quantization step size determining module is configured to determine, according to a third preset algorithm using the level scale table obtained by the level scale table obtaining module, a quantization step size for performing dequantization processing on the first transform coefficient set. The fourth dequantization module is configured to perform, according to a fourth preset algorithm using the quantization step size determined by the quantization step size determining module, dequantization processing on the first transform coefficient set.

During implementation, the level scale table obtaining module may be of the following structure including a calculation submodule and a first rounding processing submodule. The calculation submodule is configured to separately multiply M level scale values in a preset level scale table by the quantization regulation factor. The first rounding processing submodule is configured to separately perform rounding processing on M products obtained by the calculation submodule, to obtain the level scale table for performing dequantization processing on the first transform coefficient set.

During implementation, the level scale table obtaining module may alternatively be of the following structure including a range determining submodule and a level scale table obtaining submodule. The range determining submodule is configured to determine a value range of the quantization regulation factor from multiple preset value ranges. Each value range corresponds to a level scale table. The level scale table obtaining submodule is configured to obtain a level scale table corresponding to the value range of the quantization regulation factor determined by the range determining submodule.

In addition, the level scale table obtaining module may alternatively be of the following structure including a calculation submodule, a second rounding processing submodule, an integer set determining submodule, and a processing submodule. The calculation submodule is configured to separately multiply M level scale values in a preset level scale table by the quantization regulation factor. The second rounding processing submodule is configured to separately perform rounding processing on M products obtained by the calculation submodule to obtain M intermediate values. The integer set determining submodule is configured to determine M integer sets using the M intermediate values obtained by the second rounding processing submodule, where an $m^{th}$ integer set uses an $m^{th}$ intermediate value as a center, and $m=1, 2, \ldots,$ or M. The processing submodule is configured to select an integer from each of the M integer sets according to a preset rule, to form the level scale table for performing dequantization processing on the first transform coefficient set.

During implementation, the processing submodule is configured to select an integer from an integer set according to a preset rule. Further, a first intermediate value $B_{j,1}$ and a second intermediate value $B_{j,2}$ corresponding to each integer in the integer set are calculated using formulas $B_{j,1} = \lfloor 2^P/D_j \rfloor$ and $B_{j,2} = \lceil 2^P/D_j \rceil$, where P is an integer greater than 1, Dj is a $j^{th}$ integer in the integer set, j=1, 2, . . . , or J, and J is a quantity of integers included in the integer set, a third intermediate value $C_j$ corresponding to each integer in the integer set is calculated using a formula $C_j = \min(|D_j \cdot B_{j,1} - 2^P|, |D_j \cdot B_{j,2} - 2^P|)$, and a minimum value $C_k$ is determined in the third intermediate values $C_j$, and an integer corresponding to the minimum value $C_k$ is selected from the integer set.

Figure 6:
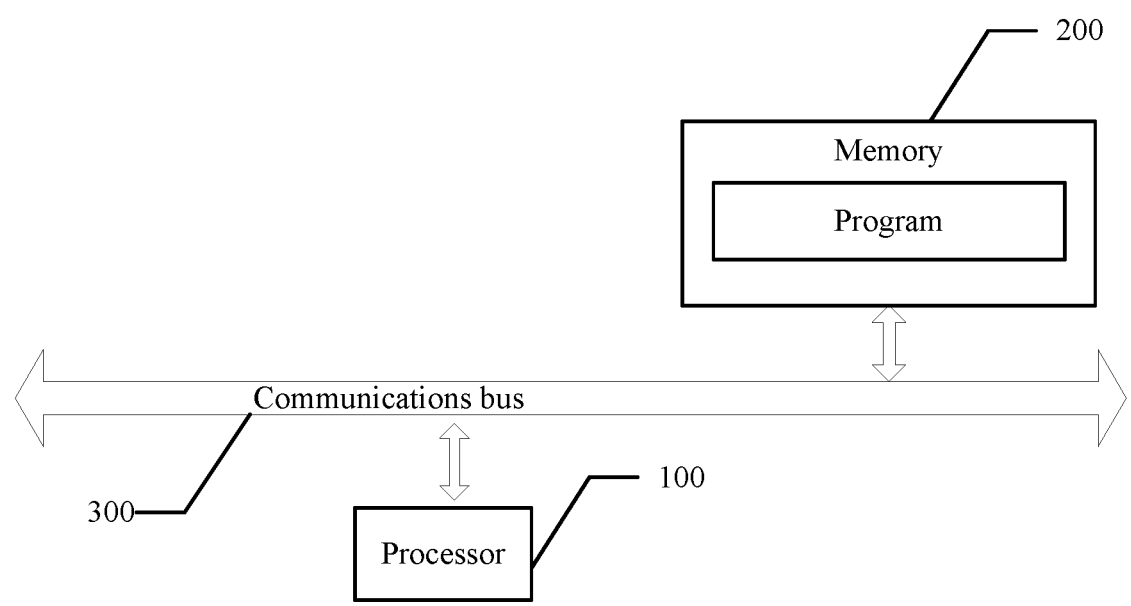
FIG. 6 is a hardware structural diagram of a decoding device according to the present disclosure.

The present disclosure further discloses a decoding device. Referring to FIG. 6, FIG. 6 shows a hardware structure of the decoding device, including a processor 100, a memory 200, and a communications bus 300.

The processor 100 and the memory 200 communicate with each other using the communications bus 300. The memory 200 is configured to store a program. The processor 100 is configured to execute the program stored by the memory 200. The processor 100 may be a central processing unit (CPU), or an application-specific integrated circuit (ASIC), or one or more integrated circuits configured to implement this embodiment of the present disclosure. The memory 200 may include a high-speed random access memory (RAM), and may further include a non-volatile memory such as at least one disk memory.

The processor 100 invokes the program stored in the memory 200 to perform the following steps of determining, using division information, a unit size of a to-be-processed unit corresponding to a first transform coefficient set, where the first transform coefficient set and the division information are generated by performing entropy decoding on a code stream, determining a quantization regulation factor for the first transform coefficient set according to a first preset algorithm and the unit size of the to-be-processed unit, where with the first preset algorithm, the quantization regulation factor decreases progressively with a value of the unit size of the to-be-processed unit, and performing dequantization processing on a transform coefficient in the first transform coefficient set according to a second preset algorithm using the quantization regulation factor to obtain a second transform coefficient set.

If the functions of the method in the embodiment are implemented in the form of a software functional unit and sold or used as an independent product, the functions may be stored in a computing device-readable storage medium. Based on such an understanding, the part of the embodiments of this application contributing to other approaches or some of the technical solutions may be implemented in a form of a software product. The software product is stored in a storage medium, and includes several instructions for instructing a computing device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a read-only memory (ROM), a RAM, a magnetic disk, or an optical disc.

The embodiments in this specification are all described in a progressive manner, for same or similar parts in the embodiments, refer to these embodiments, and each embodiment focuses on a difference from other embodiments.

The embodiments disclosed above are described to enable a person skilled in the art to implement or use the present application. Various modifications made to the embodiments will be obvious to a person skilled in the art, and the general principles defined herein may also be implemented in other embodiments without departing from the spirit or scope of the present application. Therefore, this application is not intended to be limited to these embodiments illustrated in this specification, but shall be construed in the widest scope consistent with the principles and novel features disclosed in this specification.

What is claimed is:

1. A transform coefficient dequantization method, comprising:
   setting, using division information, a unit size of a to-be-processed unit corresponding to a first transform coefficient set, wherein the first transform coefficient set and the division information are generated from entropy decoding on a code stream;
   determining a quantization regulation factor (QC) for the first transform coefficient set according to a first preset algorithm and the unit size of the to-be-processed unit, wherein determining the QC comprises calculating the QC using a formula $$QC = M_1^{(A_1 - \log_{N_1} Size)/K_1},$$

wherein Size comprises the unit size of the to-be-processed unit, wherein $N_1$ and $M_1$ comprise positive numbers not less than one, wherein $K_1$ and $A_1$ comprise positive numbers, and wherein the QC decreases progressively with the first preset algorithm and with the unit size of the to-be-processed unit;
   performing dequantization processing on a transform coefficient in the first transform coefficient set according to a second preset algorithm using the QC to obtain a second transform coefficient set; and
   recovering a video image using the second transform coefficient set.

2. The transform coefficient dequantization method of claim 1, wherein the to-be-processed unit comprises a first transform unit, and wherein setting the unit size of the to-be-processed unit corresponding to the first transform coefficient set comprises:
   determining a size of the first transform unit using the division information; and
   setting the size of the first transform unit as the unit size of the to-be-processed unit.

3. The transform coefficient dequantization method of claim 1, wherein the to-be-processed unit comprises a first transform unit and a first coding unit, wherein the first coding unit is a smallest coding unit comprising the first transform unit, and wherein setting the unit size of the to-be-processed unit corresponding to the first transform coefficient set comprises:
   determining a size of the first transform unit using the division information;
   determining a size of the first coding unit using the division information;
   setting the size of the first coding unit as the unit size of the to-be-processed unit when the size of the first coding unit is greater than a first threshold; and
   setting the size of the first transform unit as the unit size of the to-be-processed unit when the size of the first coding unit is less than or equal to the first threshold.

4. The transform coefficient dequantization method of claim 1, wherein determining the QC further comprises:

parsing the code stream to obtain sizes of T transform units allowed for use, wherein a quantization regulation factor corresponds to a largest transform unit ($QC_1$), wherein quantization regulation factor difference information between a $t^{th}$-level transform unit and a $(t-1)^{th}$-level transform unit is carried in the code stream ($dQC_t$), t=2, 3, . . . , or T, wherein T is an integer greater than three for any two transform units at adjacent levels, wherein a size of a transform unit at a lower level being greater than a size of another transform unit, and wherein the $dQC_t$ being all or partially greater than zero;

determining, using the $QC_1$ and the $dQC_t$, quantization regulation factors corresponding to the T transform units;

setting a transform unit whose size being the same as that of the first transform unit and of the T transform units as a target transform unit; and setting a quantization regulation factor corresponding to the target transform unit as a quantization regulation factor for the to-be-processed unit.

5. The transform coefficient dequantization method of claim 1, wherein performing the dequantization processing on the transform coefficient in the first transform coefficient set comprises performing the dequantization processing on each transform coefficient in the first transform coefficient set using a formula R(i)=sign {A(i)}·round{A(i)·Qs(i)·QC+ o2(i)}, wherein i=1, 2, . . . , or N, wherein N comprises a quantity of transform coefficients comprised in the first transform coefficient set, wherein A(i) comprises an $i^{th}$ transform coefficient in the first transform coefficient set, wherein Qs(i) comprises an original quantization step size corresponding to the A(i), wherein o2(i) comprises a roundoff bias corresponding to the A(i), and wherein R(i) comprises an $i^{th}$ transform coefficient in the second transform coefficient set.

6. The transform coefficient dequantization method of claim 1, wherein performing the dequantization processing on the transform coefficient in the first transform coefficient set comprises:

performing the dequantization processing on each transform coefficient in the first transform coefficient set using a formula B(i)=sign{A(i)}·round {A(i)·Qs(i)+o4(i)} to obtain a third transform coefficient set; and performing scaling process and rounding process on each transform coefficient in the third transform coefficient set using a formula R(i)=sign{B(i)}·round {B(i)·QC+ o5(i)} to obtain the second transform coefficient set, wherein i=1, 2, . . . , or N, wherein N comprises a quantity of transform coefficients comprised in the first transform coefficient set, wherein A(i) comprises an $i^{th}$ transform coefficient in the first transform coefficient set, wherein Qs(i) comprises an original quantization step size corresponding to A(i), wherein o4(i) comprises a roundoff bias corresponding to the A(i), wherein B(i) comprises an $i^{th}$ transform coefficient in the third transform coefficient set, wherein o5(i) comprises a roundoff bias corresponding to the B(i), and wherein R(i) comprises an $i^{th}$ transform coefficient in the second transform coefficient set.

7. The transform coefficient dequantization method of claim 1, wherein performing the dequantization processing on the transform coefficient in the first transform coefficient set comprises obtaining a level scale table corresponding to the QC.

8. The transform coefficient dequantization method of claim 7, further comprising:

determining, according to a third preset algorithm using the level scale table, a quantization step size to perform dequantization processing on the first transform coefficient set; and performing, according to a fourth preset algorithm using the quantization step size, dequantization processing on the first transform coefficient set.

9. A transform coefficient dequantization apparatus, comprising:

a memory comprising instructions; and a processor coupled to the memory, the instructions causing the processor to be configured to:

set, using division information, a unit size of a to-be-processed unit corresponding to a first transform coefficient set, wherein the first transform coefficient set and the division information are generated from entropy decoding on a code stream;

determine a quantization regulation factor (QC) for the first transform coefficient set according to a first preset algorithm and the unit size of the to-be-processed unit, wherein the QC decreases progressively with the first preset algorithm and with a value of the unit size of the to-be-processed unit;

calculate the QC using a formula:

$$QC = M_1^{(A_1 - \log_{N_1} Size)/K_1},$$

wherein Size comprises the unit size of the to-be-processed unit, wherein $N_1$ and $M_1$ comprise positive numbers not less than 1, and wherein $K_1$ and $A_1$ comprise positive numbers;

perform dequantization processing on a transform coefficient in the first transform coefficient set, wherein the dequantization processing is performed according to a second preset algorithm using the QC to obtain a second transform coefficient set; and recover a video image using the second transform coefficient set.

10. The transform coefficient dequantization apparatus of claim 9, wherein the to-be-processed unit comprises a first transform unit, and wherein, to set the unit size of the to-be-processed unit corresponding to the first transform coefficient set, the instructions further cause the processor to be configured to:

determine a size of the first transform unit using the division information; and set the size of the first transform unit as the unit size of the to-be-processed unit.

11. The transform coefficient dequantization apparatus of claim 9, wherein the to-be-processed unit comprises a first transform unit and a first coding unit, wherein the first coding unit is a smallest coding unit comprising the first transform unit, and wherein, to set the unit size of the to-be-processed unit corresponding to the first transform coefficient set, the instructions further cause the processor to be configured to:

determine a size of the first transform unit using the division information;

determine a size of the first coding unit using the division information;

set the size of the first coding unit as the unit size of the to-be-processed unit when the size of the first coding unit is greater than a first threshold; and set the size of the first transform unit as the unit size of the to-be-processed unit when the size of the first coding unit is less than or equal to the first threshold.

12. The transform coefficient dequantization apparatus of claim 10, wherein, to determine the QC, the instructions further cause the processor to be configured to:
parse the code stream to obtain sizes of T transform units allowed for use, wherein a quantization regulation factor corresponds to a largest transform unit ($QC_1$), wherein quantization regulation factor difference information between a $t^{th}$-level transform unit and a $(t-1)^{th}$-level transform unit is carried in the code stream ($dQC_t$), wherein t=2, 3, . . . , or T, wherein T comprises an integer greater than three for any two transform units at adjacent levels, wherein a size of a transform unit at a lower level is greater than a size of another transform unit, and wherein the $dQC_t$ is all or partially greater than 0;
determine, using the $QC_1$ and the $dQC_t$, quantization regulation factors corresponding to the T transform units;
set a transform unit whose size being the same as that of the first transform unit and of the T transform units as a target transform unit; and
set a quantization regulation factor corresponding to the target transform unit as a quantization regulation factor for the to-be-processed unit.

13. The transform coefficient dequantization apparatus of claim 9, wherein, to perform the dequantization processing on the transform coefficient in the first transform coefficient set, the instructions further cause the processor to be configured to perform the dequantization processing on each transform coefficient in the first transform coefficient set using a formula R(i)=sign {A(i)}·round {A(i)·Qs(i)·QC+o2(i)}, wherein i=1, 2, . . . , or N, wherein N comprises a quantity of transform coefficients comprised in the first transform coefficient set, wherein A(i) comprises an $i^{th}$ transform coefficient in the first transform coefficient set, wherein Qs(i) comprises an original quantization step size corresponding to the A(i), wherein o2(i) comprises a roundoff bias corresponding to the A(i), and wherein R(i) comprises an $i^{th}$ transform coefficient in the second transform coefficient set.

14. The transform coefficient dequantization apparatus of claim 9, wherein, to perform the dequantization processing on the transform coefficient in the first transform coefficient set, the instructions further cause the processor to be configured to:
perform the dequantization processing on each transform coefficient in the first transform coefficient set using a formula B(i)=sign {A(i)}·round {A(i)·Qs(i)+o4(i)} to obtain a third transform coefficient set; and
perform scaling process and rounding process on each transform coefficient in the third transform coefficient set using a formula R(i)=sign {B(i)} ·round {B(i)·QC+o5(i)} to obtain the second transform coefficient set, wherein i=1, 2, . . . , or N, wherein N comprises a quantity of transform coefficients comprised in the first transform coefficient set, wherein A(i) comprises $i^{th}$ an $i^{th}$ transform coefficient in the first transform coefficient set, wherein Qs(i) comprises an original quantization step size corresponding to the A(i), wherein o4(i) comprises a roundoff bias corresponding to the A(i), wherein B(i) comprises an $i^{th}$ transform coefficient in the third transform coefficient set, wherein o5(i) comprises a roundoff bias corresponding to the B(i), and wherein R(i) comprises an $i^{th}$ transform coefficient in the second transform coefficient set.

15. A decoding device, comprising:
a memory configured to store a program; and
a processor coupled to the memory using a communications bus and configured to invoke the program stored in the memory to perform the steps of:
determining, using division information, a unit size of a to-be-processed unit corresponding to a first transform coefficient set, wherein the first transform coefficient set and the division information are being generated from entropy decoding on a code stream;
determining a quantization regulation factor (QC) for the first transform coefficient set according to a first preset algorithm and the unit size of the to-be-processed unit, wherein determining the QC comprises calculating the QC using a formula:

$$QC = M_1^{(A_1 - \log_{N_1} Size)/K_1},$$

wherein Size comprises the unit size of the to-be-processed unit, wherein $N_1$ and $M_1$ comprise positive numbers not less than one, and wherein $K_1$ and $A_1$ comprise positive numbers, and wherein the quantization regulation factor decreases progressively with the first preset algorithm and with a value of the unit size of the to-be-processed unit;
performing dequantization processing on a transform coefficient in the first transform coefficient set, wherein the dequantization processing is performed according to a second preset algorithm using the quantization regulation factor to obtain a second transform coefficient set; and
recovering a video image using the second transform coefficient set.

16. The decoding device of claim 15, wherein the to-be-processed unit comprises a first transform unit, and wherein setting the unit size of the to-be-processed unit corresponding to the first transform coefficient set comprises:
determining a size of the first transform unit using the division information; and
setting the size of the first transform unit as the unit size of the to-be-processed unit.

17. The decoding device of claim 15, wherein the to-be-processed unit comprises a first transform unit and a first coding unit, wherein the first coding unit is a smallest coding unit comprising the first transform unit, and wherein setting the unit size of the to-be-processed unit corresponding to the first transform coefficient set comprises:
determining a size of the first transform unit using the division information;
determining a size of the first coding unit using the division information,
setting the size of the first coding unit as the unit size of the to-be-processed unit when the size of the first coding unit is greater than a first threshold, and
setting the size of the first transform unit as the unit size of the to-be-processed unit when the size of the first coding unit is less than or equal to the first threshold.

18. The decoding device of claim 15, wherein performing the dequantization processing on the transform coefficient in the first transform coefficient set comprises obtaining a level scale table corresponding to the QC.

19. The decoding device of claim 18, further comprising:
- determining, according to a third preset algorithm using the level scale table, a quantization step size to perform dequantization processing on the first transform coefficient set; and
- performing, according to a fourth preset algorithm using the quantization step size, dequantization processing on the first transform coefficient set.

\* \* \* \* \*

UNITED STATES PATENT AND TRADEMARK OFFICE
CERTIFICATE OF CORRECTION

PATENT NO. : 10,630,983 B2  
APPLICATION NO. : 15/970638  
DATED : April 21, 2020  
INVENTOR(S) : Yin Zhao and Haitao Yang Page 1 of 1

It is certified that error appears in the above-identified patent and that said Letters Patent is hereby corrected as shown below:

In the Claims

Claim 14, Column 35, Line 60: "comprises ith an" should read "comprises an".

Claim 15, Column 36, Line 12: "information are being" should read "information are".

Signed and Sealed this  
Sixteenth Day of June, 2020

Andrei Iancu  
*Director of the United States Patent and Trademark Office*